(12) United States Patent
Burnham

(10) Patent No.: US 6,597,232 B1
(45) Date of Patent: Jul. 22, 2003

(54) DATA STORAGE HAVING ENVIRONMENTAL COMMUNICATION MODULE (ECM)

(75) Inventor: Steven Burnham, Blackstone, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/109,614

(22) Filed: Mar. 28, 2002

(51) Int. Cl.[7] .............................................. H03K 17/62
(52) U.S. Cl. ...................................................... 327/407
(58) Field of Search ................................. 327/403, 404, 327/405, 407, 408, 409, 410, 411, 412, 413, 414, 415, 416, 417

(56) References Cited

U.S. PATENT DOCUMENTS

| | | | | |
|---|---|---|---|---|
| 5,510,742 A | * | 4/1996 | Lemaire | ...................... 327/146 |
| 5,744,995 A | * | 4/1998 | Young | .......................... 327/407 |
| 6,300,889 B1 | * | 10/2001 | Piasecki | ...................... 341/122 |

* cited by examiner

Primary Examiner—Jeffrey Zweizig
(74) Attorney, Agent, or Firm—Daly, Crowley & Mofford, LLP

(57) ABSTRACT

A multiplexer having a plurality of multiplexer devices. Each one of the devices is adapted to couple a selected one of a plurality of $2^c$ output/input ports, where C is an integer, to an input/output port of such device when an N bit device address code fed to such device matches an N bit device address wired to the device. The one of the output/input ports is selected in accordance with a C bit channel select code fed to the device. The multiplexer includes a plurality of cascaded levels of such devices, a first one of such levels having a plurality of $[2^N-M]$, where M is a non-zero integer less than $2^N$ of the devices. A common port for the multiplexer is connected to the input/output ports of the plurality of the devices in the first level, The input/output ports of the devices in a succeeding level are connected to the output/input ports of the devices in the preceding level of devices. In one embodiment, N is 3 and M is 5. In one embodiment, each one of the devices passes an I2C signal.

3 Claims, 18 Drawing Sheets

DATA STORAGE HAVING ENVIRONMENTAL COMMUNICATION MODULE (ECM)

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computers and servers (collectively referred to herein as "host computer/servers") require large capacity data storage systems.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a plurality buses. One set the disk directors is connected to one of the buses and another set of the disk directors is connected to another one of the buses. Likewise, one set the host computer/server directors is connected to one of the buses and another set of the host computer/server directors is directors connected to the one of the buses. The cache memories are connected to the plurality of buses. Each one of the buses provides data, address and control information.

The arrangement is shown schematically in FIG. 1. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 in interface 13 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

When data is to be read from a disk drive in bank 22 to the host computer/server 12 the system operates in a reciprocal manner. More particularly, during a read operation, a read request is instituted by the host computer/server 12 for data at specified memory locations (i.e., a requested data block). One of the front-end directors 14 receives the read request and examines the cache memory 18 to determine whether the requested data block is stored in the cache memory 18. If the requested data block is in the cache memory 18, the requested data block is read from the cache memory 18 and is sent to the host computer/server 12. If the front-end director 14 determines that the requested data block is not in the cache memory 18 (i.e., a so-called "cache miss") and the director 14 writes a note in the cache memory 18 (i.e., the "mail box") that it needs to receive the requested data block. The back-end directors 20 poll the cache memory 18 to determine whether there is an action to be taken (i.e., a read operation of the requested block of data). The one of the back-end directors 20 which poll the cache memory 18 mail box and detects a read operation reads the requested data block and initiates storage of such requested data block stored in the cache memory 18. When the storage is completely written into the cache memory 18, a read complete indication is placed in the "mail box" in the cache memory 18. It is to be noted that the front-end directors 14 are polling the cache memory 18 for read complete indications. When one of the polling front-end directors 14 detects a read complete indication, such front-end director 14 completes the transfer of the requested data which is now stored in the cache memory 18 to the host computer/server 12.

The use of mailboxes and polling requires time to transfer data between the host computer/server 12 and the bank 22 of disk drives thus reducing the operating bandwidth of the interface.

As is also known in the art, it is desirable to monitor remotely the operation of the interface, such as for determining whether there has been a fault in the processing of the data. Detection of such fault is reported to a remote service center 23 (FIG. 1) by a telephone link 19, for example, between the interface 13 and the remote service or fault monitoring center 23. Further, a service processing personal computer (PC) 21, such as a laptop computer, is provided within the electrical cabinet for the interface 13. The computer 21 is coupled to the directors 20. Diagnostic programs are provided in the computer 21 which enables a dispatched service person to local diagnose and repair, or replace, any faulted hardware within the interface 13 and take corrective action. Thus, the service processor (i.e., the PC is able to manage the system and provide an interface to the from the storage system to the outside world. In addition, the service processor PC can be used to introduce code upgrades to the system. Thus, the service processor must be able to communicate with all directors in the system.

More recently, software is being developed which effects the functionality of the system. For example, software stored in and processed by the service processor PC is able to monitor the storage activity of the disk drives. It is thus able to detect those drives which are receiving the most activity. Once this storage, or hot-spot, activity of the disk drives is determined by the service processor, the service processor communicates with the directors to modify the software therein and thus their handing of data and to thereby balance the activity among all the disk drives, i.e., remove any hot-spots.

SUMMARY OF THE INVENTION

In accordance with the present invention, a multiplexer is provided having a plurality of multiplexer devices. Each one of the devices is adapted to couple a selected one of a plurality of $2^C$ output/input ports, where C is an integer, to an input/output port of such device when an N bit device address code fed to such device matches an N bit device address wired to the device. The one of the output/input ports is selected in accordance with a C bit channel select code fed to the device. The multiplexer includes a plurality of cascaded levels of such devices, a first one of such levels having a plurality of $[2^N-M]$, where M is a non-zero 5 integer less than $2^N$ of the devices. A common port for the multiplexer is connected to the input/output ports of the plurality of the devices in the first level, The input/output ports of the devices in a succeeding level are connected to the output/input ports of the devices in the preceding level of devices.

In one embodiment, N is 3 and M is 5.

In one embodiment, each one of the devices passes an I2C signal.

BRIEF DESCRIPTION OF THE DRAWINGS

These and other features of the invention will become more readily apparent from the following detailed description when read together with the accompanying drawings, in which.

DETAILED DESCRIPTION

Figure 1:
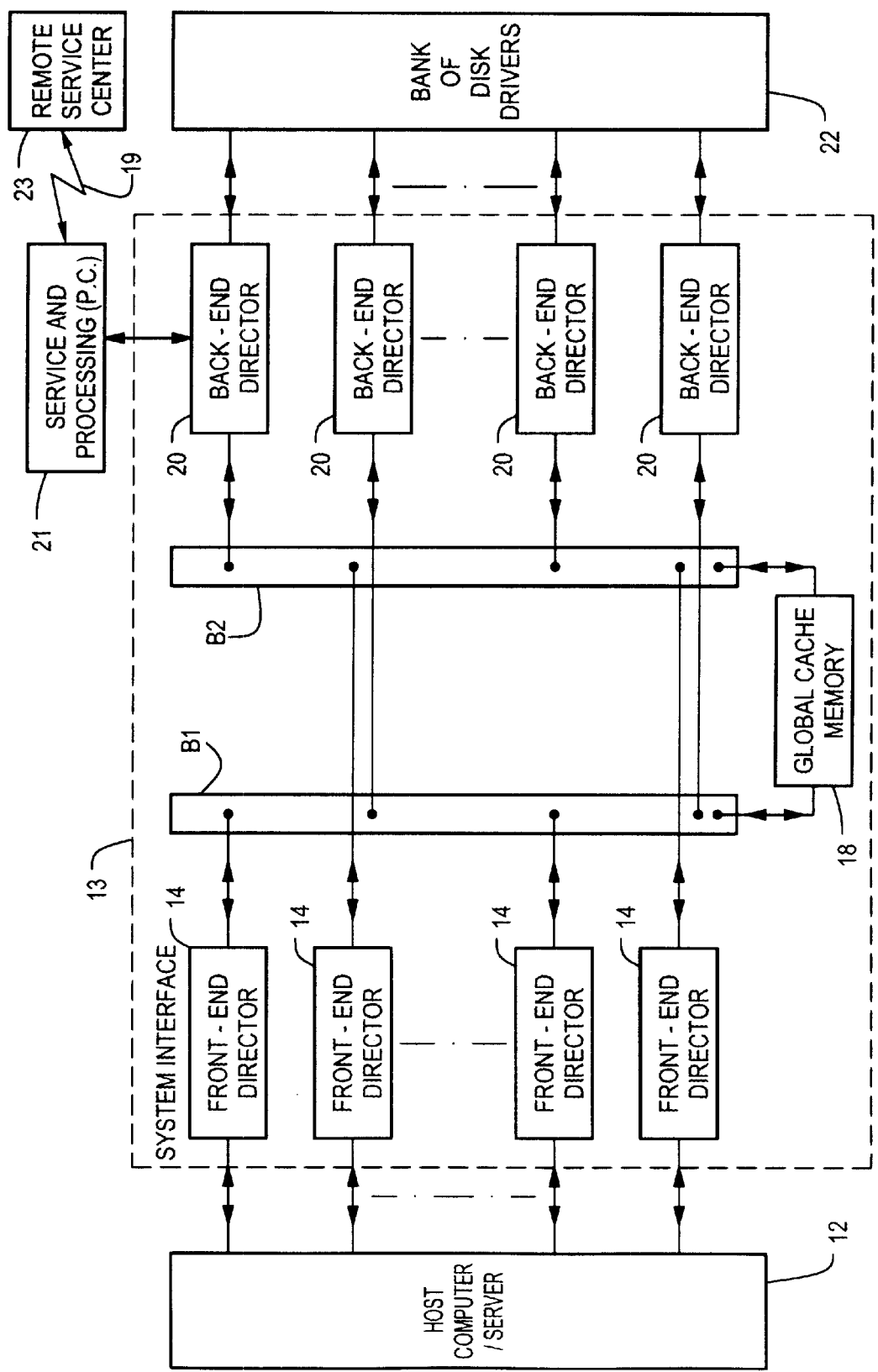
FIG. 1 is a block diagram of a data storage system according to the PRIOR ART.
Figure 2:
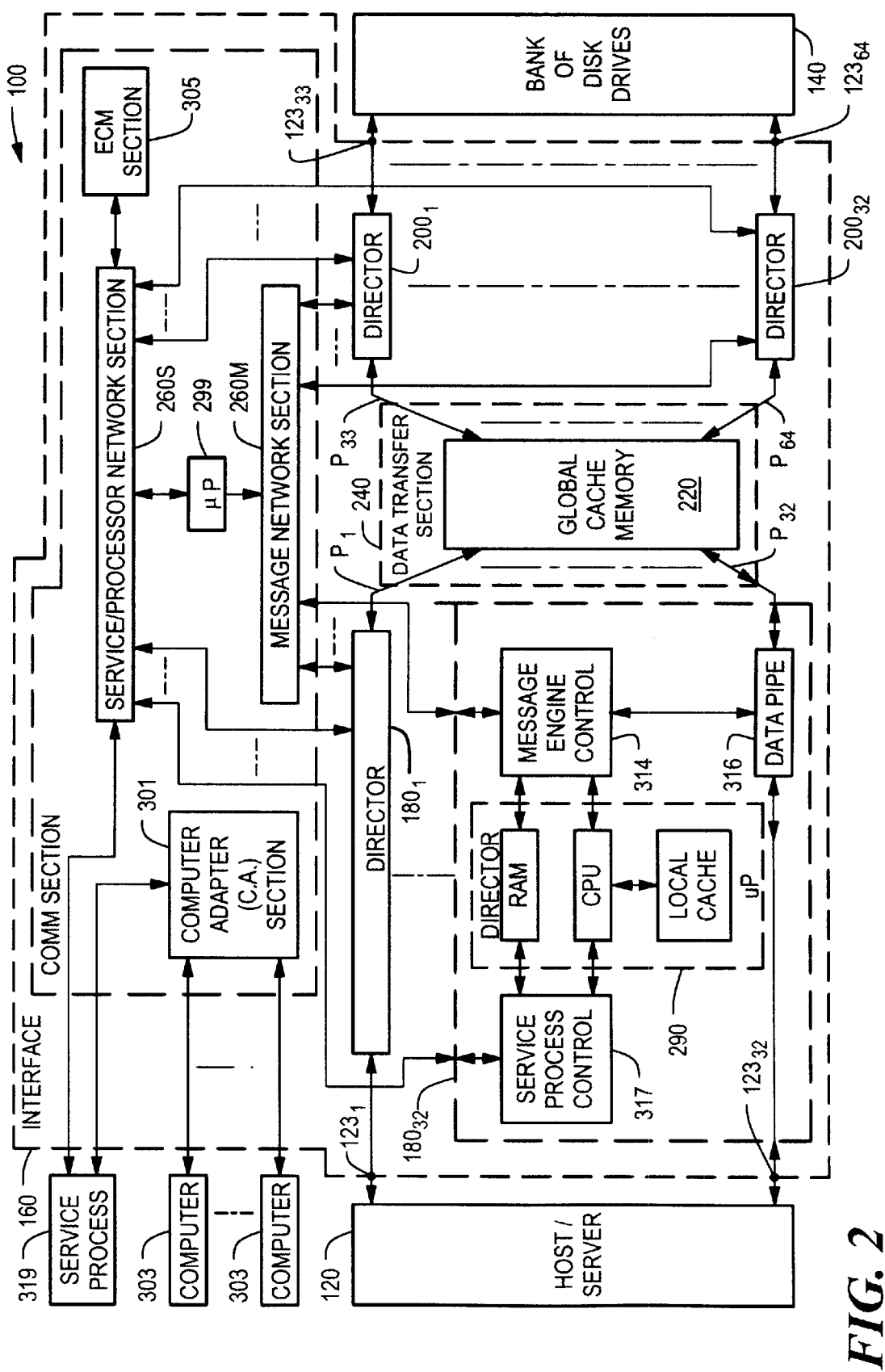
FIG. 2 is a block diagram of a data storage system according to the invention.
Figure 3:
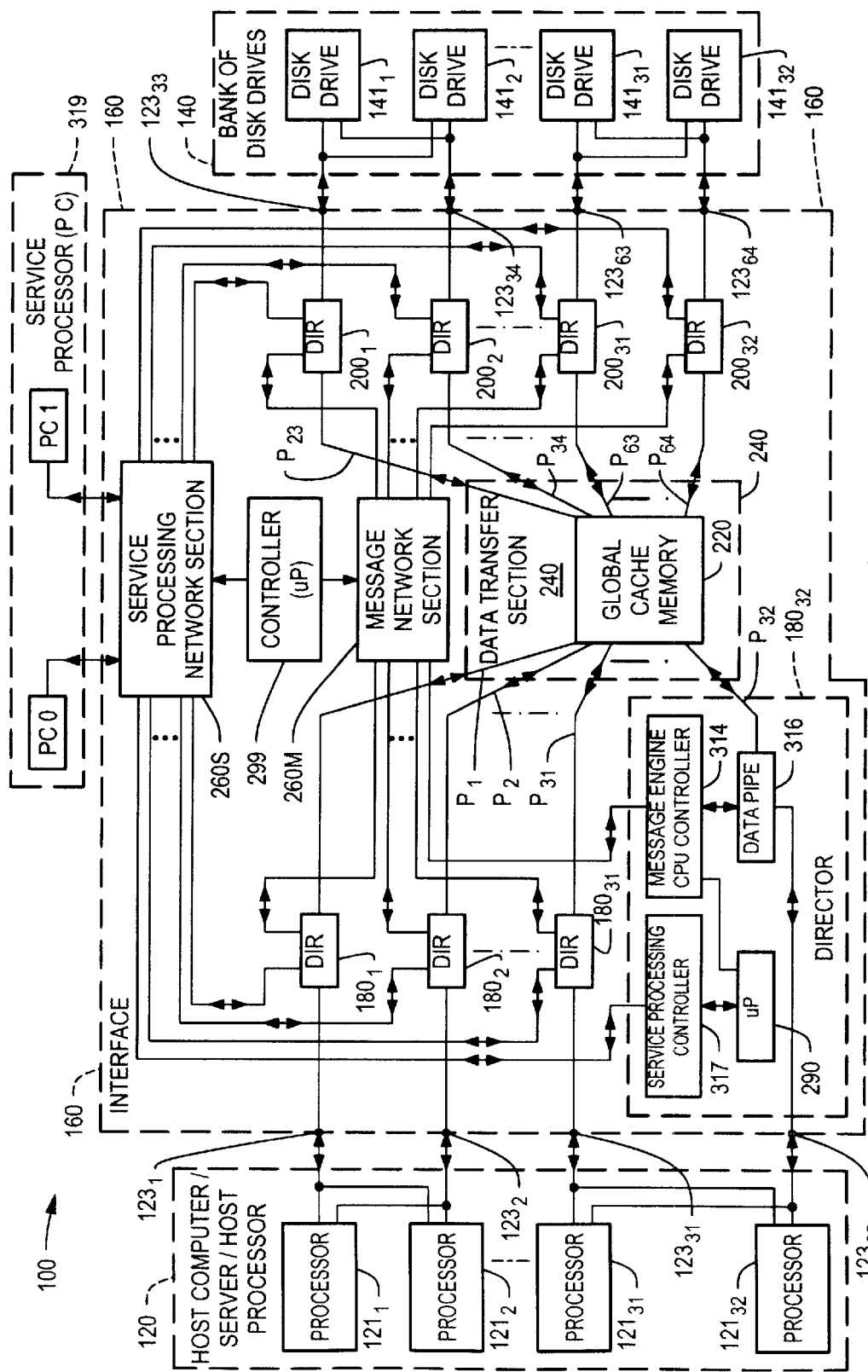
FIG. 3 is a more detailed block diagram of a data storage system according to the invention.

Referring now to FIG. 2, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{32}$ and the back-end directors $200_1$–$200_{32}$; a messaging network 260M and service processor network section 260S, operative independently of the data transfer section 240 under control of a common microprocessor 299, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar. Thus, as shown for an exemplary one of the front and back-end directors, here front-end director $180_{32}$, such director $180_{32}$ is shown to include: a microprocessor (μP) 290 (i.e., a central processing unit (CPU) and local cache memory (RAM)); a message engine/CPU controller 314, a data pipe 316, and a service processor controller 317. The message engine CPU controller 314 and data pipe 316 together with their operation with the microprocessor 290 are described in detail in co-pending patent application Ser. No. 09/540,828 entitled "Data Storage System Having Separate Data Transfer Section and Message Network", filed Mar. 31, 2000, Ofek et al. and assigned to the same assignee as the present invention, the entire subject matter thereof being incorporated herein by reference. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the message network 260M. The messages facilitate the data transfer between host computer/server 120 and the bank of disk drives 140 with such data passing through the global cache memory 220 via the data transfer section 240. Thus, data passes between the host computer 120 and the back of disk drives 140 through the data pipes 317 via the global cache memory 240 under control of the message network 260M as described in detail in the above referenced copending patent application. The service processor network section 260S enables a service processor 319, here having a pair of redundant personal computers PC0 and PC1 as shown in FIG. 3, to communicate with any one of the front-end directors $180_1$–$180_{32}$ or any one of the back-end directors $200_1$–$200_{32}$ under control of the service processor network section 260S, in a manner to be described in more detail below in connection with FIGS. 6–9. Suffice it to say here, however, that either one of the PCs (i.e., PC0 or PC1) has access to any one of the directors $180_1$–$180_{32}$, $200_1$–$200_{32}$ via the service processor network section 260S.

More particularly, and considering the message network 260M, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$.

With such an arrangement, the cache memory 220 in the data transfer section 240 is not burdened with the task of transferring the director messaging. Rather, the message network and service processor network 260M, 260S operates independent of the data transfer section 240 thereby increasing the operating bandwidth of the system interface 160.

In operation, and considering first a read request by the host computer/server 120 (i.e., the host computer/server 120 requests data from the bank of disk drives 140), the request is passed from one of a plurality of, here 32, host computer processors $121_1$–$121_{32}$ in the host computer 120 to one or more of the pair of the front-end directors $180_1$–$180_{32}$ connected to such host computer processor $121_1$–$121_{32}$. (It is noted that in the host computer 120 (FIG. 3), each one of the host computer processors $121_1$–$121_{32}$ is coupled to here a pair (but not limited to a pair) of the front-end directors $180_1$–$180_{32}$, to provide redundancy in the event of a failure in one of the front end-directors $180_1$–$180_{32}$ coupled thereto. Likewise, the bank of disk drives 140 has a plurality of, here 32, disk drives $141_1$–$141_{32}$, each disk drive $141_1$–$141_{32}$ being coupled to here a pair (but not limited to a pair) of the back-end directors $200_1$–$200_{32}$, to provide redundancy in the event of a failure in one of the back-end directors $200_1$–$200_{32}$ coupled thereto). Each front-end director $180_1$–$180_{32}$ includes a microprocessor ($\mu$P) 290, as described in the above-reference patent application. Suffice it to say here, however, that the microprocessor 290 makes a request for the data from the global cache memory 220. The global cache memory 220 has a resident cache management table, not shown. Every director $180_1$–$180_{32}$, $200_1$–$200_{32}$ has access to the resident cache management table and every time a front-end director $180_1$–$180_{32}$ requests a data transfer, the front-end director $180_1$–$180_{32}$ must query the global cache memory 220 to determine whether the requested data is in the global cache memory 220. If the requested data is in the global cache memory 220 (i.e., a read "hit"), the front-end director $180_1$–$180_{32}$, more particularly the microprocessor 299 therein, mediates a DMA (Direct Memory Access) operation for the global cache memory 220 and the requested data is transferred to the requesting host computer processor $121_1$–$121_{32}$.

If, on the other hand, the front-end director $180_1$–$180_{32}$ receiving the data request determines that the requested data is not in the global cache memory 220 (i.e., a "miss") as a result of a query of the cache management table in the global cache memory 220, such front-end director $180_1$–$180_{32}$ concludes that the requested data is in the bank of disk drives 140. Thus the front-end director $180_1$–$180_{32}$ that received the request for the data must make a request for the data from one of the back-end directors $200_1$–$200_{32}$ in order for such back-end director $200_1$–$200_{32}$ to request the data from the bank of disk drives 140. The mapping of which back-end directors $200_1$–$200_{32}$ control which disk drives $141_1$–$141_{32}$ in the bank of disk drives 140 is determined during a power-up initialization phase. The map is stored in the global cache memory 220. Thus, when the front-end director $180_1$–$180_{32}$ makes a request for data from the global cache memory 220 and determines that the requested data is not in the global cache memory 220 (i.e., a "miss"), the front-end director $180_1$–$180_{32}$ is also advised by the map in the global cache memory 220 of the back-end director $200_1$–$200_{32}$ responsible for the requested data in the bank of disk drives 140. The requesting front-end director $180_1$–$180_{32}$ then must make a request for the data in the bank of disk drives 140 from the map designated back-end director $200_1$–$200_{32}$. This request between the front-end director $180_1$–$180_{32}$ and the appropriate one of the back-end directors $200_1$–$200_{32}$ (as determined by the map stored in the global cache memory 200) is by a message which passes from the front-end director $180_1$–$180_{32}$ through the message network 260M to the appropriate back-end director $200_1$–$200_{32}$. It is noted then that the message does not pass through the global cache memory 220 (i.e., does not pass through the data transfer section 240) but rather passes through the separate, independent message network 260M. Thus, communication between the directors $180_1$–$180_{32}$, $200_1$–$200_{32}$ is through the message network 260M and not through the global cache memory 220. Consequently, valuable bandwidth for the global cache memory 220 is not used for messaging among the directors $180_1$–$180_{32}$, $200_1$–$200_{32}$.

Thus, on a global cache memory 220 "read miss", the front-end director $180_1$–$180_{32}$ sends a message to the appropriate one of the back-end directors $200_1$–$200_{32}$ through the message network 260M to instruct such back-end director $200_1$–$200_{32}$ to transfer the requested data from the bank of disk drives 140 to the global cache memory 220. When accomplished, the back-end director $200_1$–$200_{32}$ advises the requesting front-end director $180_1$–$180_{32}$ that the transfer is accomplished by a message, which passes from the back-end director $200_1$–$200_{32}$ to the front-end director $180_1$–$180_{32}$ through the message network 260M. In response to the acknowledgement signal, the front-end director $180_1$–$180_{32}$ is thereby advised that such front-end director $180_1$–$180_{32}$ can transfer the data from the global cache memory 220 to the requesting host computer processor $121_1$–$121_{32}$ as described above when there is a cache "read hit".

It should be noted that there might be one or more back-end directors $200_1$–$200_{32}$ responsible for the requested data. Thus, if only one back-end director $200_1$–$200_{32}$ is responsible for the requested data, the requesting front-end director $180_1$–$180_{32}$ sends a uni-cast message via the message network 260M to only that specific one of the back-end directors $200_1$–$200_{32}$. On the other hand, if more than one of the back-end directors $200_1$–$200_{32}$ is responsible for the requested data, a multi-cast message (here implemented as a series of uni-cast messages) is sent by the requesting one of the front-end directors $180_1$–$180_{32}$ to all of the back-end directors $200_1$–$200_{32}$ having responsibility for the requested data. In any event, with both a uni-cast or multi-cast message, such message is passed through the message network 260M and not through the data transfer section 240 (i.e., not through the global cache memory 220).

Likewise, it should be noted that while one of the host computer processors $121_1$–$121_{32}$ might request data, the acknowledgement signal may be sent to the requesting host computer processor 121, or one or more other host computer processors $121_1$–$121_{32}$ via a multi-cast (i.e., sequence of uni-cast) messages through the message network 260M to complete the data read operation.

Considering a write operation, the host computer 120 wishes to write data into storage (i.e., into the bank of disk drives 140). One of the front-end directors $180_1$–$180_{32}$ receives the data from the host computer 120 and writes it into the global cache memory 220. The front-end director $180_1$–$180_{32}$ then requests the transfer of such data after some period of time when the back-end director $200_1$–$200_{32}$ determines that the data can be removed from such cache memory 220 and stored in the bank of disk drives 140. Before the transfer to the bank of disk drives 140, the data in the cache memory 220 is tagged with a bit as "fresh data" (i.e., data which has not been transferred to the bank of disk drives 140, that is data which is "write pending"). Thus, if there are multiple write requests for the same memory location in the global cache memory 220 (e.g., a particular bank account) before being transferred to the bank of disk drives 140, the data is overwritten in the cache memory 220 with the most recent data. Each time data is transferred to the global cache memory 220, the front-end director $180_1$–$180_{32}$ controlling the transfer also informs the host computer 120 that the transfer is complete to thereby free-up the host computer 120 for other data transfers.

When it is time to transfer the data in the global cache memory 220 to the bank of disk drives 140, as determined by the back-end director $200_1$–$200_{32}$, the back-end director $200_1$–$200_{32}$ transfers the data from the global cache memory 220 to the bank of disk drives 140 and resets the tag associated with data in the global cache memory 220 (i.e., un-tags the data) to indicate that the data in the global cache memory 220 has been transferred to the bank of disk drives 140. It is noted that the un-tagged data in the global cache memory 220 remains there until overwritten with new data.

Referring again to FIG. 2, the interface 160 also includes a computer adapter network 301 adapted for coupling one or more of a plurality of computers 303 to the PCs in the service processor 319. Further, the interface 160 also includes environmental communication modules (ECM) 305, coupled to the service processor network section 260S, as shown. The computer adapter network 301 will be discussed in more detail below in connection with FIG. 10 and the ECM 305 will be discussed in more detail below in connection with FIG. 11.

Figure 4:
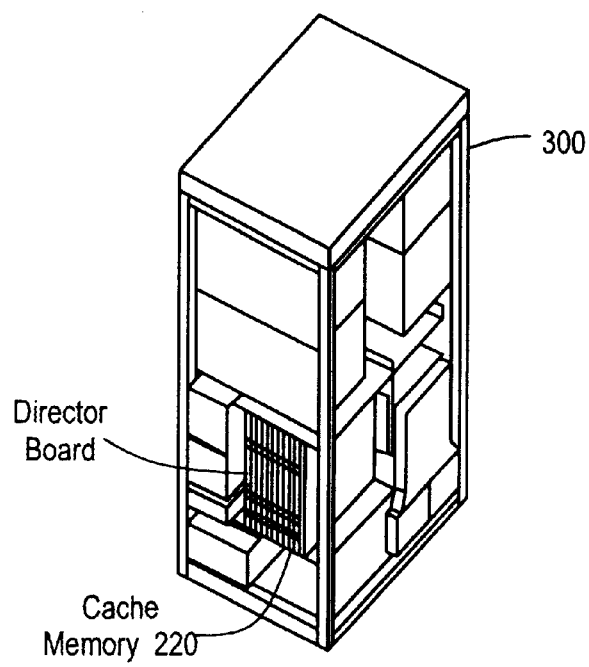
FIG. 4 is a sketch of an electrical cabinet storing a system interface used in the data storage system of FIG. 2.
Figure 5:
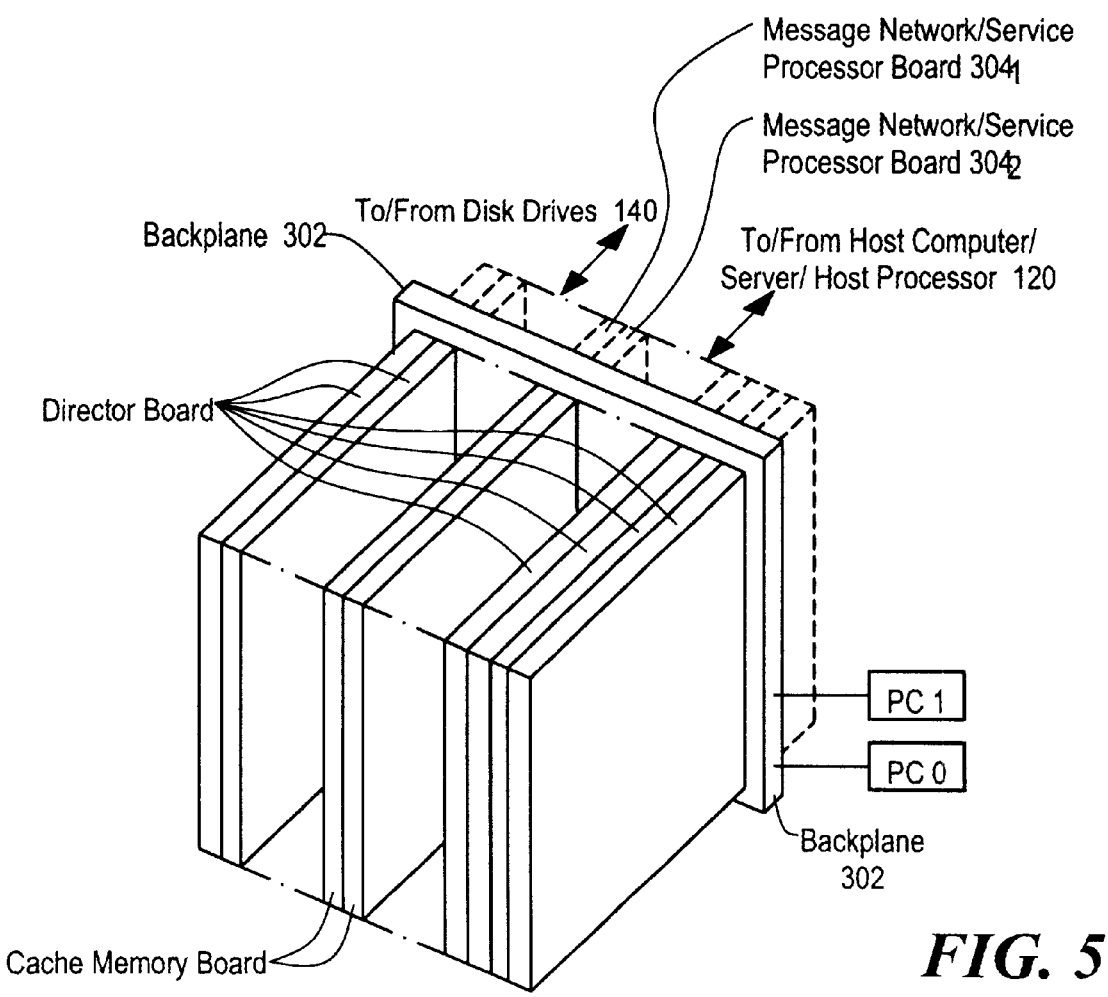
FIG. 5 is a diagrammatical, isometric sketch showing printed circuit boards providing the system interface of the data storage system of FIG. 2.
Figure 6:
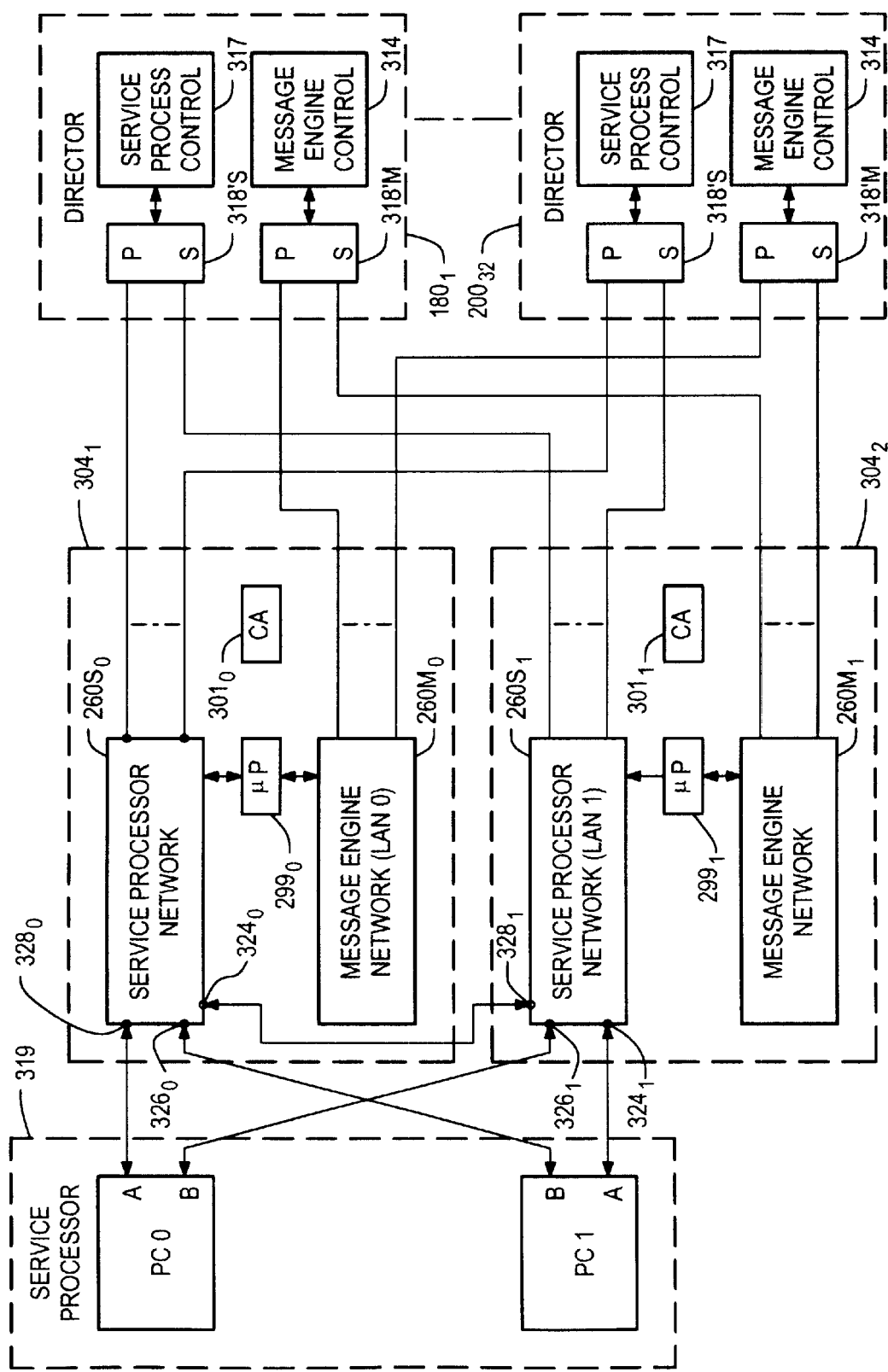
FIG. 6 is a block diagram showing the relationship between service processor networks and a message engine networks used in the system of FIGS. 2 and 3.

Referring now to FIGS. 3 and 4, the system interface 160 is shown to include an electrical cabinet 300 having stored therein: a plurality of, here eight front-end director boards $190_1$–$190_8$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards 220 which together make up the global cache memory 220. (It is noted that the cabinet 300 may store the PCs, PC0 and PC1, shown in FIG. 3). These boards plug into the front side of a backplane 302. (It is noted that the backplane 302 is a mid-plane printed circuit board). Plugged into the back-side of the backplane 302 is a pair of redundant message network/service processor boards $304_1$, $304_2$, and the PCs, PC0 and PC1. In should be noted that each one of the message network/service processor boards $304_1$, $304_2$ includes: a service processor network section 260S (FIG. 2), a message network 260M, a microprocessor 299, and a computer adapter (CA) network 301, as shown in FIG. 6. Thus, board 304, includes: a first service processor network $260S_0$, a first message network $260M_0$, and a first CA network $301_0$, while board $304_2$ includes: a second service processor network $260S_1$, a second message network $260M_1$, and a second CA network $301_1$. It is first noted that the service processing network section 260S (FIG. 2) includes the pair of redundant first and second service processing networks $260S_0$ and $260S_1$, the message network section 260M (FIG. 2) includes the pair of redundant first and second message networks $260M_0$ and $260M_1$, and the CA network section 301 (FIG. 2) includes the pair of redundant first and second CA networks $301_0$ and $301_1$. (The connections to and from the CA networks $301_1$ and $301_2$ will be described in more detail in connection with FIG. 10.) Also plugged into the backside of the backplane 302 (FIG. 4 and 5) is the ECM section 305 (FIG. 2) which includes a pair of redundant ECM boards $305_1$, $305_2$, respectively, to be described in more detail below in connection with FIG. 11. The backside of the backplane 302 has plugged into it adapter boards, not shown in FIGS. 2, 3 and 7, which couple the boards plugged into the back-side of the backplane 302 with the computer 120 and the bank of disk drives 140 as shown in FIG. 2. That is, referring again briefly to FIG. 2, an I/O adapter, not shown, is coupled between each one of the front-end directors $180_1$–$180_{32}$ and the host computer 120 and an I/O adapter, not shown, is coupled between each one of the back-end directors $200_1$–$200_{32}$ and the bank of disk drives 140. More particularly, each one of the I/O adapter, not shown, is plugged into the backplane behind a corresponding one of the director boards. The ECM boards $305_1$, $305_2$ and message network/service processor boards $304_1$, $304_2$ plug into the backplane behind the memory boards.

SERVICE PROCESSOR NETWORK 260S

Referring now again to FIG. 2, it is noted that the service processor network 260S provides communication between the service processor 319 and the front-end and back-end directors $180_1$–$180_{32}$, $200_1$–$200_{32}$. Referring to FIG. 6, as noted above, the service processor 319 includes a pair of redundant PCs, PC0 and PC1, and that there is a pair of redundant service processor networks $260S_0$ and $260S_1$. Thus, as shown functionally in FIG. 6, each director includes a pair of multiplexer arrangements 318'M, 318'S; multiplexer arrangement 318'M for the message engine control 314 and multiplexer arrangement 318'S for the service processor control 371, as shown. These multiplexer arrangements 318'M, 318'S are similar, multiplexer arrangements 318'M, being described in detail in the above-referenced patent application. Thus, as shown in more detail in FIG. 7, these multiplexer arrangements 318'M, 318'S are implemented as crossbar switches 318M, 318S; one pair for each director board.) Thus, each one of the service processor networks $260S_0$, $260S_1$ (FIG. 6) has access to each one of the front-end and back-end directors $180_1$–$200_{32}$, as shown in FIG. 6 via the primary (P) or secondary (S) port of the multiplexer arrangement 318'S. Thus, as shown in FIG. 6, the P port of each of the multiplexer arrangements 318'S is coupled to the service processor network $260S_0$ while the S port of such multiplexer arrangements 318'S is coupled to the service processor network $260S_1$. Thus, each service processor controller 317 of each one of the front-end and back-end directors $180_1-200_{32}$, is accessible by either the service processor network $260S_0$, or the service processor $260S_1$.

Further, PC0 has access to both service processor networks $260S_0$ and $260S_1$, here Ethernet LANs. Likewise, PC1 has access to both service processor networks $260S_0$ and $260S_1$. Consequently, if there is a fault in the primary service processor $260S_0$, or a fault in the entire board $304_1$, the PC0 can access any one of the front-end or back-end directors through service processor network $260S_1$. Likewise, if there is a fault in the secondary service processor $260S_1$, or a fault in the entire board $304_2$, the PC1 can access any one of the front-end or back-end directors through service processor network $260S_0$. Further, if there is a fault in PC0, PC1 can access either one of the service processor networks $260S_0$ and $260S_1$. Likewise, if there is a fault in PC1, PC0 can access either one of the service processor networks $260S_0$ and $260S_1$.

Figure 7:
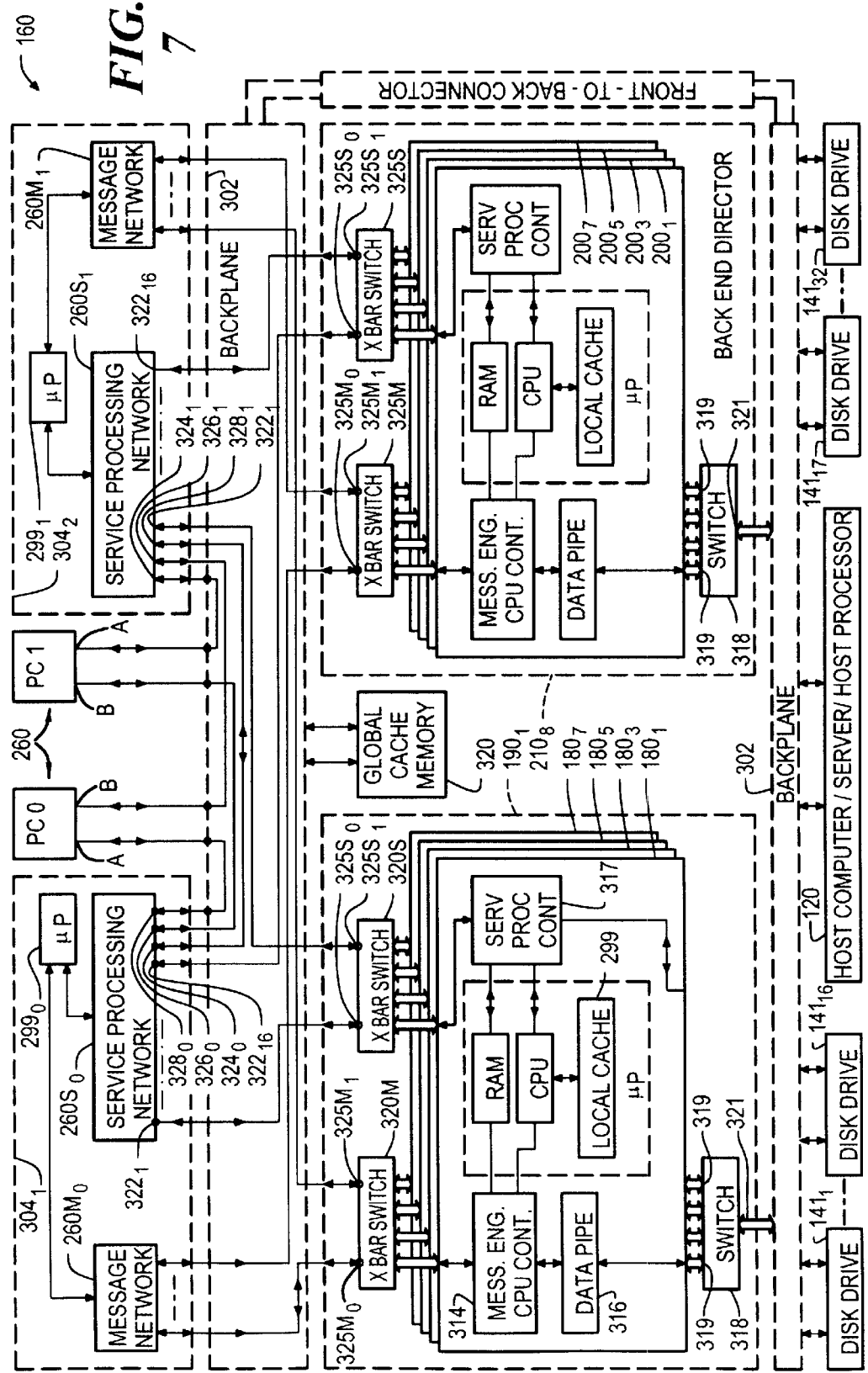
FIG. 7 is a more detailed block diagram showing the relationship between service processor networks and a message engine networks used in the system of FIGS. 2 and 3 according to the invention.

Referring now to FIG. 7, the system interface 160 is shown in more detail to include the director boards $190_1-190_8$, $210_1-210_8$ and the global cache memory 220, and message network/service processor boards $304_1$ and $304_2$, plugged into the backplane 302 and the disk drives $141_1-141_{32}$ in the bank of disk drives along with the host computer 120 also plugged into the backplane 302 via I/O adapter boards, not shown. (It is noted that the computer adapter CA networks $301_1$ and $301_2$ (not shown in FIG. 7) are on printed circuit boards which are also plugged into the backplane 302 behind front-end director boards in lieu of front end I/O adapter boards in such backplane 302. The CA network boards $301_1$ and $301_2$ will be discussed, as noted above, in connection with FIG. 10). Each one of the message network/service processor boards $304_1$ and $304_2$ is identical in construction. A pair of message network/service processor boards $304_1$ and $304_2$ is used for redundancy and for message load balancing. Thus, each message network/service processor board $304_1$, $304_2$, includes a controller $290_0$, $290_1$, respectively, (i.e., microprocessor comprising a CPU, system controller interface and memory), a message network $260M_0$, $260M_1$ (e.g., a switching fabric described in detail in the above referenced copending patent application) and a service processing network $260S_0$, $260S_1$ (here also a switching fabric). Thus, the message network 260M (FIG. 2) here includes a pair of redundant message networks $260M_0$, $260M_1$, as shown in FIGS. 6 and 7) and the service processor network (FIG. 2) 260S includes a pair of redundant service processor networks $260_0$, $260_1$, as shown in FIGS. 6 and 7. The service processor networks $260S_0$ and $260S_1$, are identical in construction, an exemplary one there, here network $260S_0$, will be described in more detail below in connection with FIG. 12. Suffice it to say here, however, that the communication between the directors $180_1-180_{32}$, $200_1-200_{32}$ and the service processing networks $260S_1$, $260S_2$ and the PCs PC0 and PC1 is through an Ethernet communication system.

Referring again to FIG. 7, each one of the director boards $190_1-210_8$ includes four of the directors $180_1-180_{32}$, $200_1-200_{32}$ (FIG. 2). It is noted that the director boards $190_1-190_8$ having four front-end directors per board, $180_1-180_{32}$ are referred to as front-end directors and the director boards $210_1-210_8$ having four back-end directors per board, $200_1-200_{32}$ are referred to as back-end directors. Each one of the directors $180_1-180_{32}$, $200_1-200_{32}$ includes a CPU 310, a RAM 312 (which make up the microprocessor 290 referred to above), the message engine/CPU controller 314, the data pipe 316, and the service processor controller 317 arranged as shown in FIGS. 2 and 7.

Referring again to FIG. 7, each one of the director boards $190_1-210_8$ includes a pair of crossbar switches 320M, 320S, the former being coupled to the message networks $260M_0$, and $260M_1$ and the latter being coupled to the service processor networks $260S_0$ and $260S_1$.

Each crossbar switch 320M is described in detail in the above-referenced copending patent application and has four input/output ports, each one of the four input/output ports being coupled to the message engine/CPU controller 314 of a corresponding one of the four directors $180_1-180_{32}$, $200_1-200_{32}$ on the director board 1901-2108. Each crossbar switch 320M has a pair of output/input ports $325M_1$, $325M_2$ which plug into the backplane 302 and is thereby coupled to a corresponding one message networks $260M_0$, $260M_1$, respectively, of the message network boards $304_1$, $304_2$, respectively, through the backplane 302. Thus, the message network $260M_0$ is coupled to the port $325M_0$ of the here sixteen director boards $190_1-210_8$ and therefor selectively through such switches 320M to the directors $180_1-200_{32}$, as shown in FIG. 6. Likewise, the message network $260M_1$ is coupled to the port $325M_1$ of the here sixteen director boards $190_1-210_8$ and therefor selectively through such switches 320M to the directors $180_1-200_{32}$, as shown in FIG. 6.

The crossbar switches 318M are used for coupling the data pipe 316 of a selected one of the four directors on the director board $210_1-210_8$ to the global cache memory 220 via the backplane 302 and I/O adapter, not shown. Thus, referring to FIG. 2, the data pipe 316 in the front-end directors $180_1-180_{32}$ couples data between the host computer 120 and the global cache memory 220 while the data pipe 316 in the back-end directors $200_1-200_{32}$ couples data between the bank of disk drives 140 and the global cache memory 220. It is noted in FIG. 3 that there are separate point-to-point data paths $P_1-P_{64}$ between each one of the directors $180_1-180_{32}$, $200_1-200_{32}$ and the global cache memory 220. It is also noted that the backplane 302 is a passive backplane because it is made up of only etched conductors on one or more layers of a printed circuit board. That is, the backplane 302 does not have any active components as described in the above-referenced patent application.

In like manner, each crossbar switch 320S has four input/output ports, each one of the four input/output ports being coupled to the service processor controller 317 of a corresponding one of the four directors $180_1-180_{32}$, $200_1-200_{32}$ on the director board $190_1-210_8$. Each crossbar switch 320S has a pair of output/input ports $325S_1$, $325S_2$ which plug into the backplane 302 and is thereby coupled to a corresponding one service processor networks $260S_0$, $260S_1$, respectively, of the message network/service processor boards $304_1$, $304_2$, respectively, through the backplane 302. Thus, the service processor network $260S_0$ is coupled to the port $325S_0$ of the here sixteen director boards $190_1-210_8$ and therefor selectively through such switches 320S to the directors $180_1-200_{32}$, as shown in FIG. 6. Likewise, the message network $260S_1$, is coupled to the port $325S_1$ of the here sixteen director boards $190_1-210_8$ and therefor selectively through such switches 320S to the directors $180_1-200_{32}$, as shown in FIG. 6.

The crossbar switches 318S on the director boards are used for coupling the signals of a selected one of the directors on the director board to a selected one of the PCs of the service processor 319 via the service processor network 260S.

More particularly, and referring to FIG. 7 and considering the service processor networks $260S_0$ and $260S_1$ (and recognizing that the message networks $260M_0$ and $260M_1$ are connected to switches ports $325M_0$, and $325M_1$ in like manner as described in more detail in the above-identified patent application), each one of the message network/service processor boards $304_1$, $304_2$ has sixteen input/output ports $322_1$–$322_{16}$ for the service processing network thereon, each one being coupled to a corresponding one of the output/input ports $325S_0$, $325S_1$, respectively, of a corresponding one of the director boards $190_1$–$190_8$, $210_1$–$210_8$ through the backplane 302, as shown and as described above. Thus, considering message network/service processor board $304_1$, input/output ports $322_1$–$322_8$ of service processing network $260S_0$ are coupled to output/input ports $325S_0$ of front-end director boards $190_1$–$190_8$ and input/output ports $322_9$–$322_{16}$ are coupled to output/input ports $325S_0$ of back-end director boards $210_1$–$210_8$, as shown. Likewise, considering message network/service processor board $304_2$, input/output ports $322_1$–$322_8$ of service processing network $260S_1$ thereof are coupled, via the backplane 302, to output/input ports $325S_1$ of front-end director boards $190_1$–$190_8$ and input/output ports $322_9$–$322_{16}$ are coupled, via the backplane 302, to output/input ports $325S_1$ of back-end director boards $210_1$–$210_8$. These connection for both service processor networks $260S_0$ and $260S_1$ to the front-end and back-end directors as well as for both message networks $260M_0$ and $260M_1$ to the front-end and back-end directors are shown functionally in FIG. 6.

Figure 8:
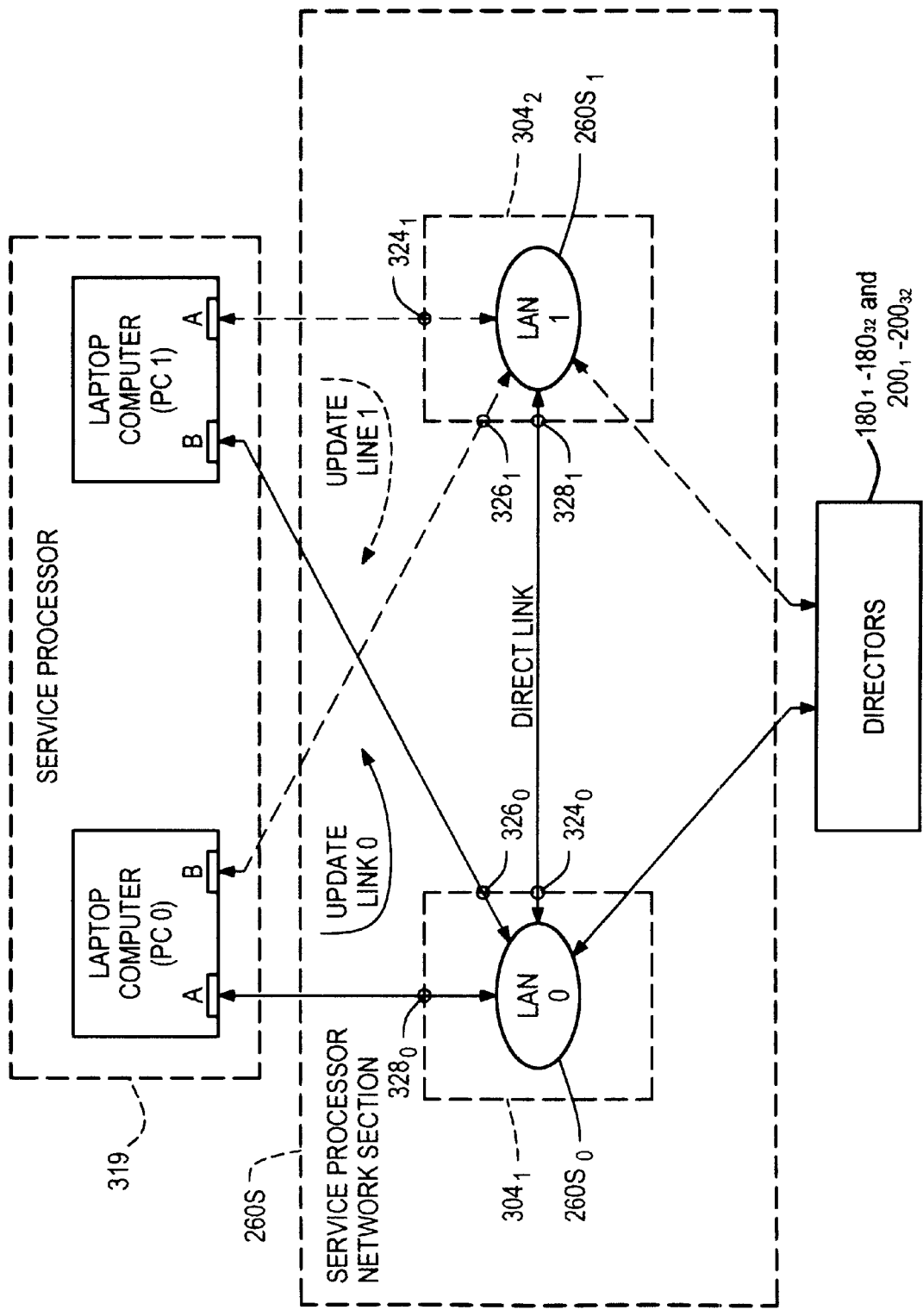
FIG. 8 is a block diagram showing the relationship between a service processor, service processor section and directors used in the system of FIG. 2 and 3 according to the invention.

Referring now to FIGS. 2, 6, 8 and 9, the service processor network 260S includes a pair of redundant service processing networks $260S_0$, $260S_1$ (which may be considered as a Local Area Networks, LANs, here Ethernet) each on a corresponding printed circuit board message network/service processor boards $304_1$ and $304_2$, respectively, as shown in FIG. 8. The service processing networks $260S_0$, $260S_1$ include three addition bi-directional ports: $324_0$, $326_0$, $238_0$, and, $324_1$, $326_1$, $328_1$, respectively, as shown. Service processing network switch $260S_0$ is directly to connected to service processing network switch 260, via an Ethernet connection which passes through the backplane 302 (as shown in FIG. 7) between port $324_0$ of switching network $260S_0$ and port $328_1$ of switch $260S_1$. The PC0 has port A thereof connected to port $328_0$ of the service processing network switch $260S_0$ via the backplane 302 (as shown in FIG. 7) and has port B thereof connected to port $326_1$ of service processing network switch $260S_1$, via backplane 302 (as shown in FIG. 7). The PC1 has port A thereof connected to port 324, of the service processing network switch $260S_1$, via the backplane 302 (as shown in FIG. 7) and has port B thereof connected to port $324_0$ of service processing network switch $260S_0$ via backplane 302 (as shown in FIG. 7). The communications between the PC0 and PC2 to and from the service processing network switches $260S_0$ and $260S_1$ is an Ethernet communication system. Thus, service processing network $260S_0$ (LAN 0) can access PC0 through two independent links: a primary link between port $328_0$ and port A of the PC0; or, if that primary link fails, a secondary link between port $324_0$ to port $328_1$ (i.e., the direct link between the two redundant service processing networks $260S_0$ and $260S_1$ (LAN 1)) and then from port $326_1$ of the service processing network $326_1$ to port B of PC0. Likewise, service processing network $260S_1$ (LAN 1) can access PC1 through two independent links: a primary link between port $324_1$ and port A of the PC1; or, if that primary link fails, a secondary link between port $328_1$ to port $324_0$ (i.e., the direct link between the two redundant service processing networks $260S_0$ and $260S_1$) and then from port $328_0$ of the service processing network $326_0$ to port B of PC1. Still further, it is also an option to keep the PCs synchronized by connecting the 'B' ports of each PC directly to one another.

Further, the two PCs PC0 and PC1 are able to be synchronized by a pair of uplinks: i.e., PC1 can be updated with the state of PC0 via an uplink between port A of PC0 and port $328_0$ of service-processor network $260S_0$ (LAN 0) and then from port $326_0$ of service processor network $260S_0$ (LAN 0) to port B of PC1, such pair of uplinks being indicated as "uplink 0" in FIG. 8). Likewise, PC0 can be updated with the state of PC1 via an uplink between port A of PC1 and port $324_1$ of service processor network $260S_1$, (LAN 1) and then from port $326_1$ of service processor network $260S_1$, (LAN 1) to port B of PC0, such pair of uplinks being indicated as "UPDATE 0 and UPDATE 1" in FIG. 8). Thus, the update links UPDATE 0 and UPDATE 1 enable the state of the two independently operable PCs (i.e., PC0 and PC1) to be synchronized with each other. Further, the arrangement provides fault tolerance in the event of any single failure in one of the two service processing networks or in one of the two PCs (i.e. PC0, PC1).

Figure 9:
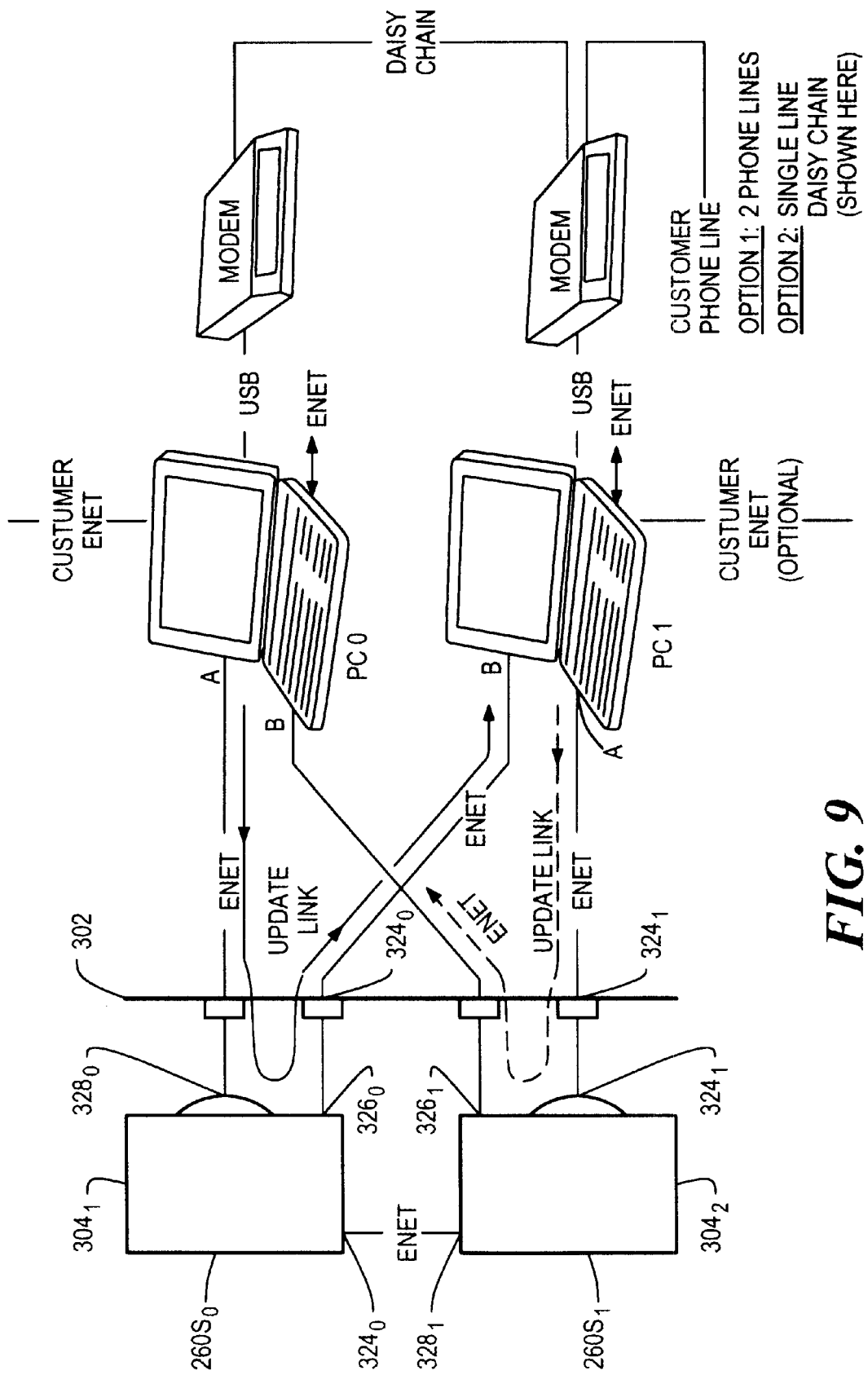
FIG. 9 is a block diagram showing connections between service processors (PCs), modems, and service processor network sections of FIG. 8.

On power-up, one of the PCs (PC0, PC1) is designated a priori (i.e., by default) as the Master PC while the other by default, the Slave PC. During normal operation, whole heart beats are sent between the two PC's via the update link, the master PC. The master and the slave are both loaded with the same software, however the master uses its stored diagnostic programs which enables a dispatched service person to local diagnose and repair, or replace, any faulted hardware within the interface 13 and take corrective action. Faults etc,. are reported via a modem, as shown in FIG. 9. Thus, the service processor (i.e., the PC is able to manage the system and provide an interface to the from the storage system to the outside world. In addition, the service processor PC can be used to introduce code upgrades to the system. Thus, the service processor must be able to communicate with all directors in the system. Also, more system functional software is executed by the PC to, for example, monitor the storage activity of the disk drives. It is thus able to detect those drives which are receiving the most activity. Once this storage, or hot-spot, activity of the disk drives is determined by the service processor, the service processor communicates with the directors to modify the software therein and thus their handing of data and to thereby balance the activity among all the disk drives, i.e., remove any hot-spots. Here a USB Modem is shown, however other modems, such as cable or dial-up modems may be used. Here, in the configuration shown in FIG. 9 two modems are shown, each one being connected to a corresponding one of the pair of PCs.

COMPUTER ADAPTER NETWORK

Figure 10:
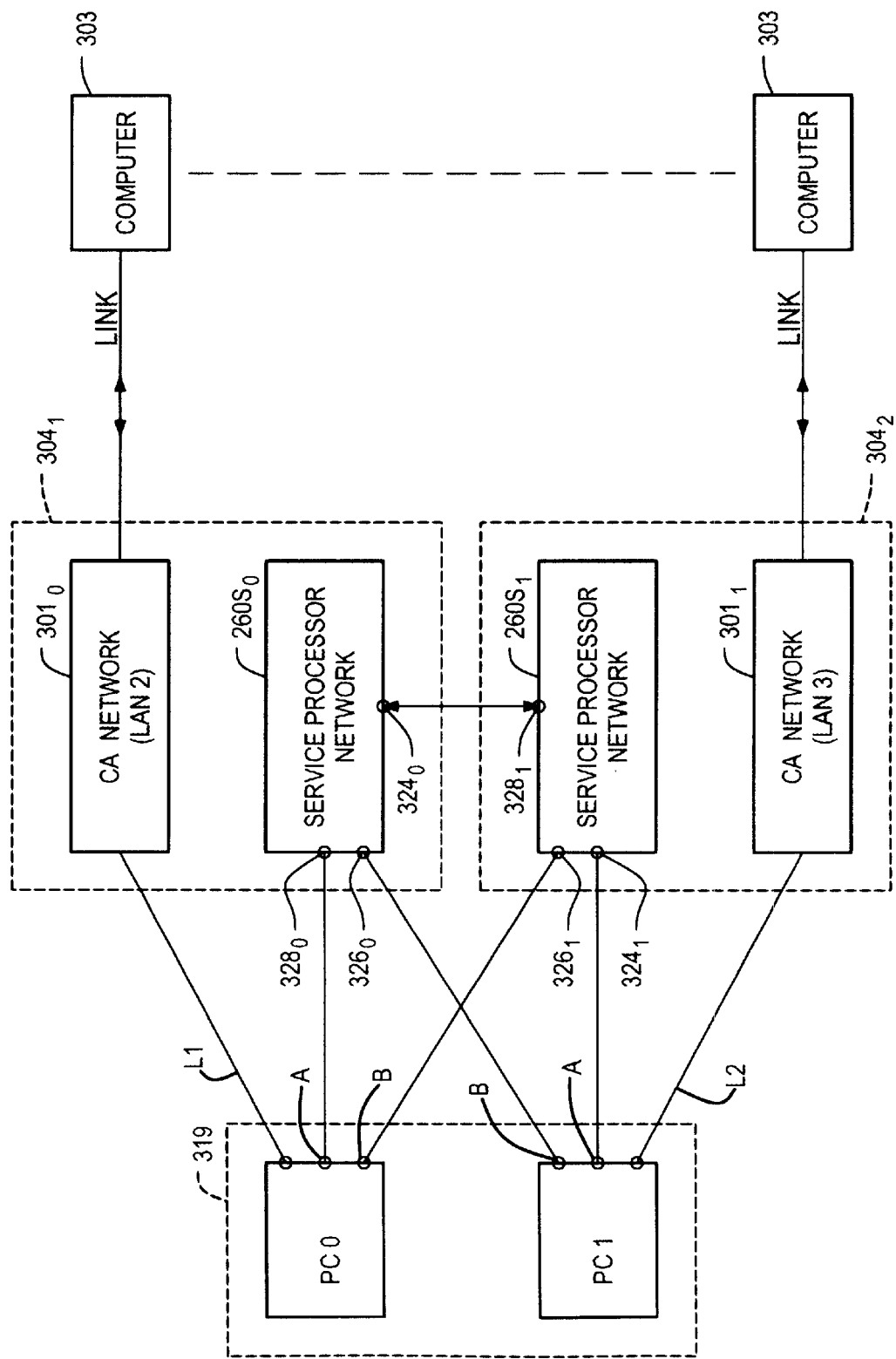
FIG. 10 is a block diagram showing connections between service processors, computer adapter networks, computers and service processor networks used in the system of FIGS. 2 and 3 according to the invention.

As noted above in connection with FIG. 2, a computer adapter (CA) network section 301 is included in the interface 160 for coupling a plurality of computers 303 to the service processor 319. There are here a pair of redundant computer adapter networks $301_1$ and $301_1$ in the computer adapter network section $301_1$ each one being on a corresponding one of the message network/service processor boards $304_1$, $304_2$, respectively, as shown in FIGS. 7 and 10. It should also be noted that the pair of redundant computer adapter networks $301_1$ and $301_1$ are local area networks, here designated as LAN 2 and LAN 3, respectively, in FIG. 10. Thus, each one of the computers 303 is connected to a corresponding link LINK, as shown in FIG. 10. Each one of the PCs, PC0 and PC1 is connected to a corresponding one of the Computer Adapter network boards CAs $301_0$ and $303_1$. Thus, PC0 is connected to CA network $301_0$ via link L1 while PC1 is connected to CA network $301_1$ via link L2. As noted above in connection with FIG. 8, each one of the PCs PC0, PC1 is connected to both service processor networks $260P_0$, $260P_1$ and the service processor networks $260P_0$, 260P are connected together through a direct link between ports $324_0$ and $328_1$.

ECMs

Figure 11:
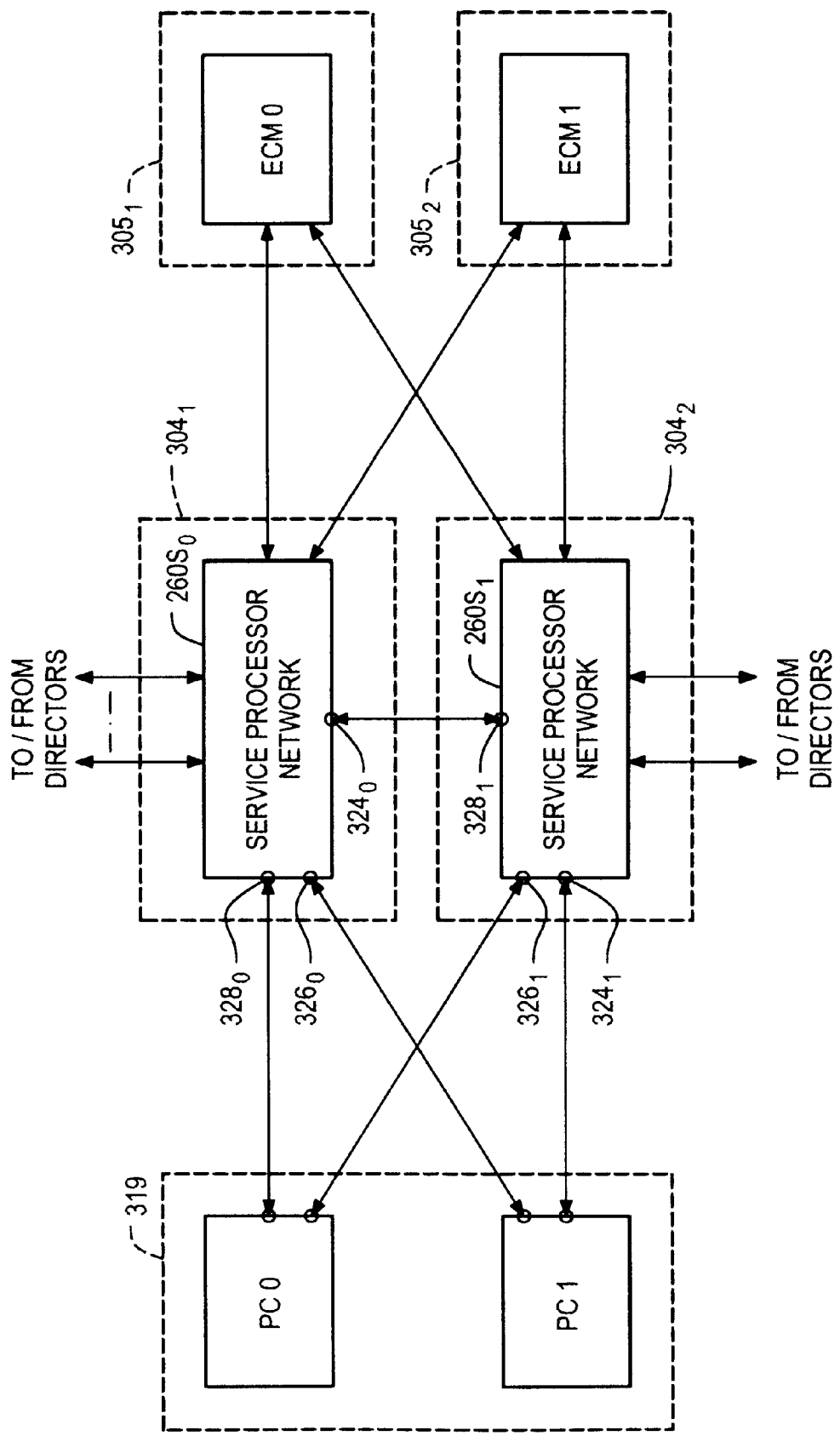
FIG. 11 is a block diagram showing connections between service processors, environmental communication modules (ECMs) and service processor networks used in the system of FIGS. 2 and 3 according to the invention.

Referring to FIG. 11, as noted above in connection with FIG. 2, the ECM section 305 includes a pair of ECM boards 305₁ and 305₂ each plugged into the back side of the backplane 302 behind memory board slots. Each one of the ECM boards 305₁ and 305₂ is coupled through the backplane 302 to both service processor networks 260S₀ and 260S₁, as shown. The connections between the service processor networks 260S₀ and 260S₁ are also shown for convenience in FIG. 11. As noted above in connection with FIG. 8, each one of the PCs PC0, PC1 is connected to both service processor networks 260P₀, 260P₁ and the service processor networks 260P₀, 260P are connected together through a direct link between ports 324₀ and. 328₁.

Figure 14:
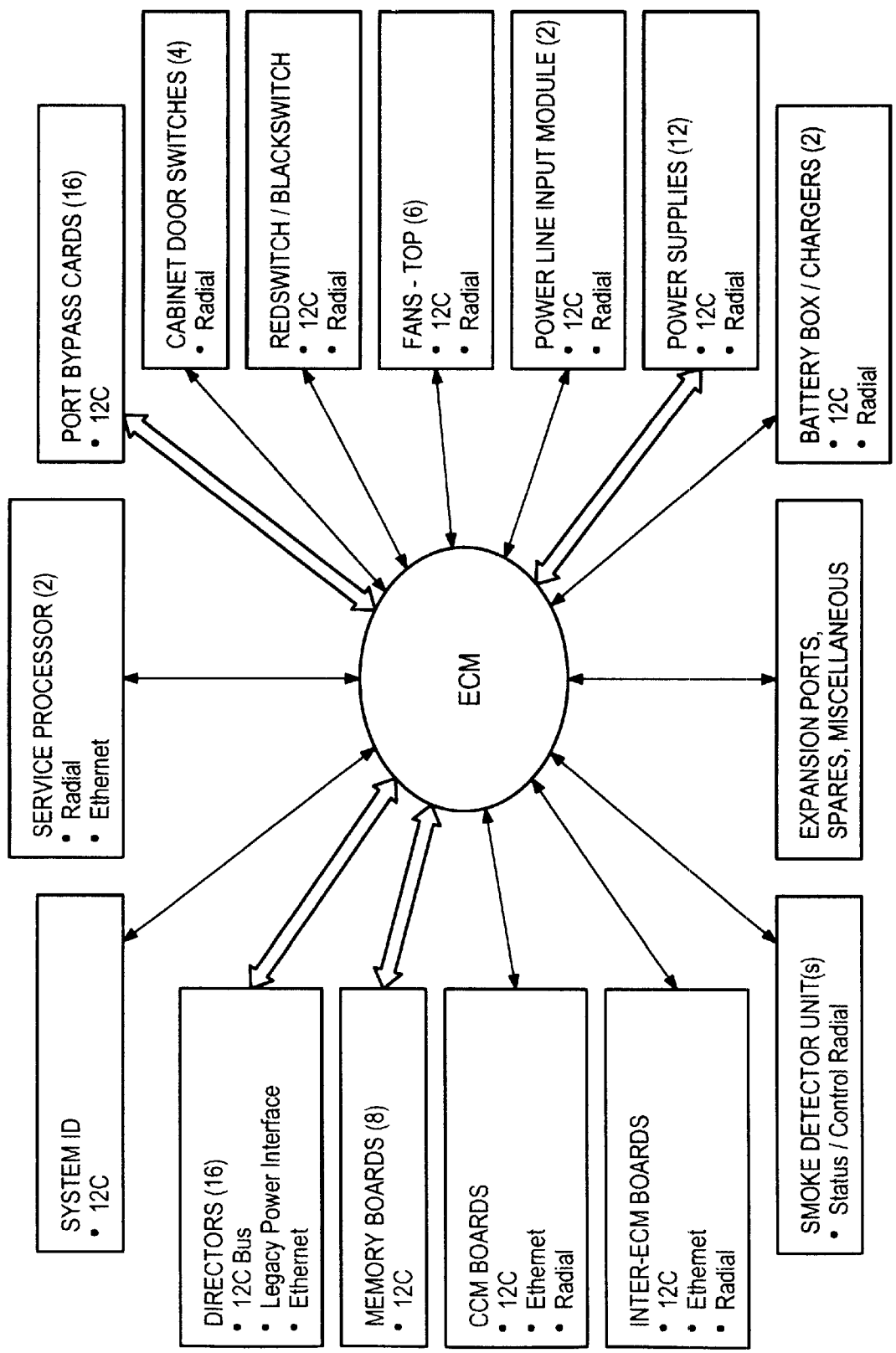
FIG. 14 shows functions performed and monitored by the ECMs used in the system of FIGS. 2 and 3 according to the invention.

More particularly, referring to FIG. 14, the ECM section 305 is provided to monitor: system ID (Serial number, model number, revision number) of the various elements in the system; the condition of the disk drives via various fibre channel port by-pass cards (PBCs) used in the system as described in co-pending patent application Ser. No. 09/343, 344 filed Jun. 30, 1999, assigned to the same assignee as the present invention, the entire subject matter thereof being incorporated herein by reference; the condition of the cabinet door switches; the condition of various cooling fan tachometers; power line input modules (PLIMs), power supplies, smoke detector units, the ECM boards themselves; the message network/service processor boards 402₁, 402₂; the memory boards; and the director boards, etc. This monitoring is provided by coupling the ECM boards 305₁, 305₂, to these elements using I2C protocol signals and by radial signals, which may supplement the information in the I2C signals. Further, as noted above, each one of the ECM boards 305₁, 305₂, communicates with the pair of service processing networks 260S₀ and 260S₁ as shown in FIG. 11 though an Ethernet.

Figure 15:
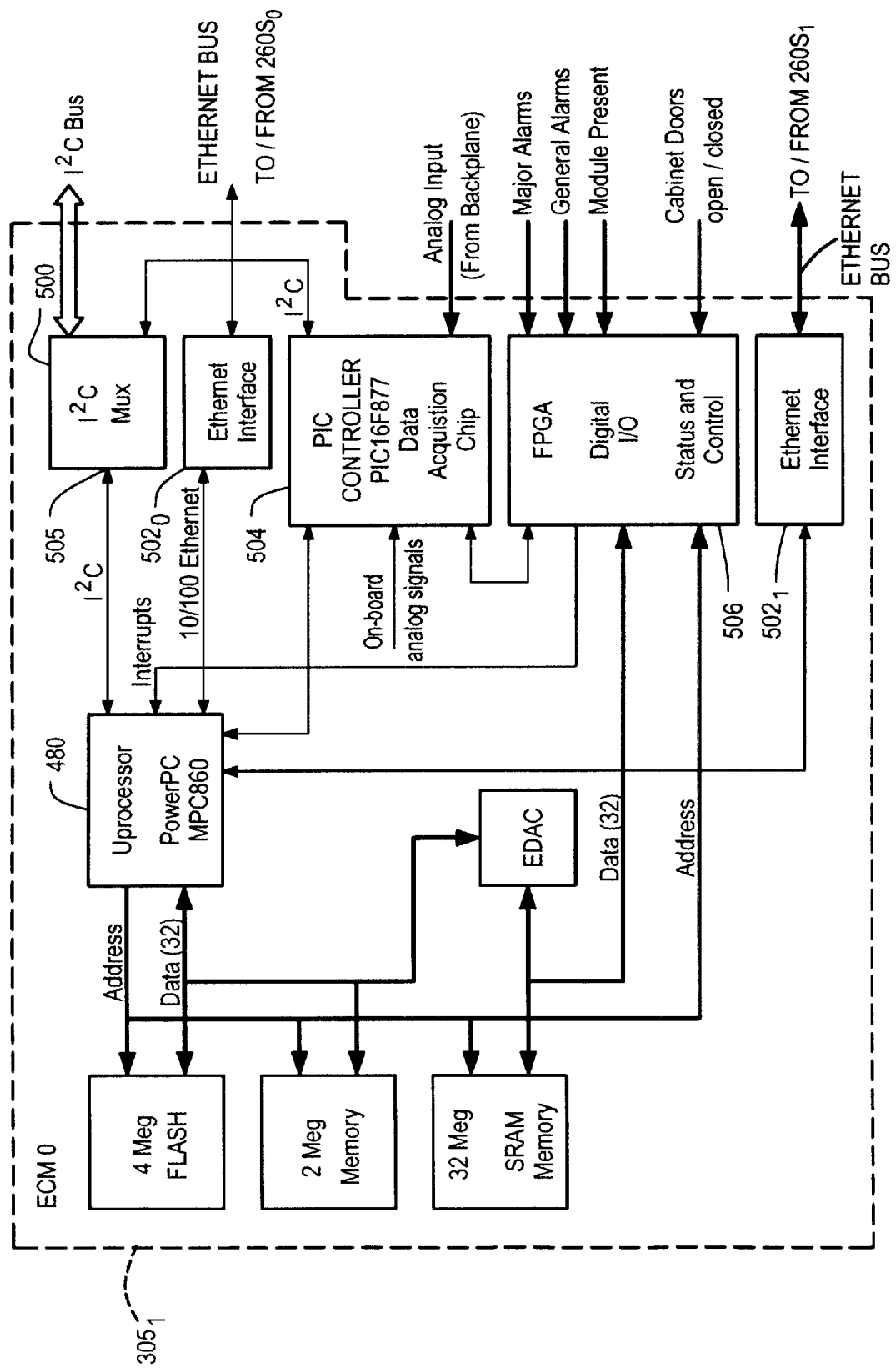
FIG. 15 is a block diagram of an exemplary one of a pair of ECMs used in the system of FIGS. 12 and 3 according to the invention.

Referring to FIG. 15, an exemplary one of the pair of ECM boards 305₁, 305₂, here board 305₁ is shown to include a microprocessor 480 coupled to: an I2C multiplexer 500, to be described in detail in connection with FIGS. 16–18; a pair of Ethernet interfaces 502₂, 502₁ coupled to service processor networks 260S₀, 260₁, respectively, as shown in FIG. 2; a microcontroller 504; and a field programmable gate array (FPGA) 506, as shown. The I2C multiplexer (MUX) couples a selected one of a plurality of I2C signals to and from the microprocessor 480 in a manner to be described in connection with FIGS. 16 and 17. Radial signals including major fault signals from various elements in the system, general alarms, and a module present signal are fed to the FPGA 506. Other analog type environmental signals on the backplane are fed to the microcontroller 504. In the event that a fault is reported to the FPGA 506, an interrupt is reported to the microprocessor 480 and such microprocessor addresses the element causing the fault to obtain data from such element via the I2C mux 500. The microprocessor 480 then communicates to the service processor 319 via the service processor networks 260S₀, 260S₁.

Figure 16:
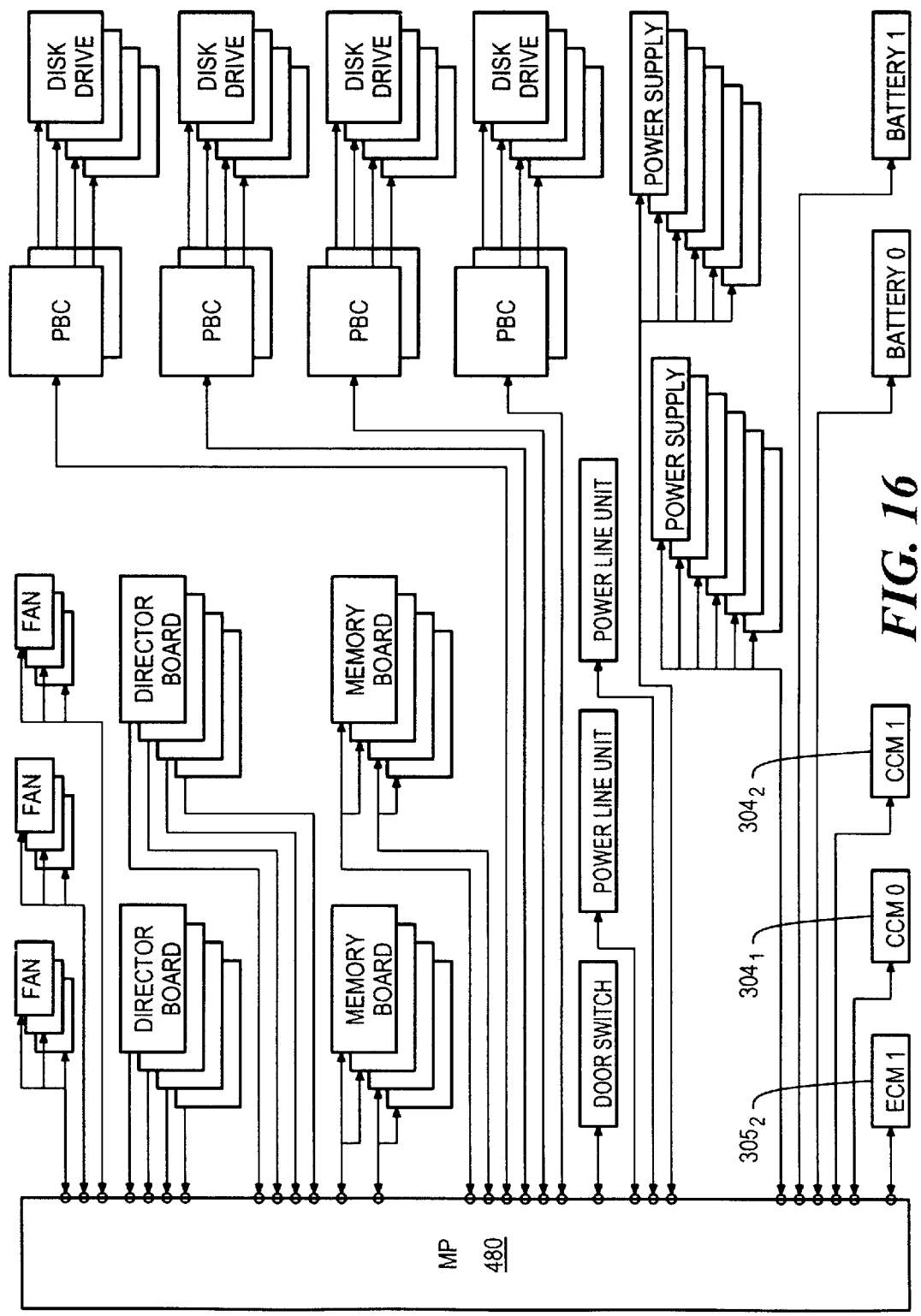
FIG. 16 is a diagram showing connections to various components used in the system of FIGS. 12 and 3 and their connections to a microprocessor used in the ECM of FIG. 15 according to the invention.

Referring now to FIG. 16, the I2C signals passing between elements in the system and the microprocessor (HP) 480 of an exemplary one of the ECM boards 305₁ and 305₂, here EMC board 305₁ is shown. It is noted that half the directors are coupled, via I2C signals, to the microprocessor (μP) 480 of one of the ECM boards 305₁, 305₂ and the other half are coupled, via I2C signals to the microprocessor (μP) 480 of the other one of the ECM boards 305₁, 305₂. Likewise, half the disk drives are coupled, via I2C signals, to the microprocessor (μP) 480 of one of the ECM boards 305₁, 305₂, and the other half are coupled, via I2C signals to the microprocessor (μP) 480 of the other one of the ECM boards 305₁, 305₂. It is also noted that the two ECM boards 305₁, 305₂ are coupled together through an I2C signal. Further, both message network/service processor boards 304₁, 304₂, are coupled to both ECM boards 305₁, 305₂ via I2C signals. Also coupled to both ECM boards 305₁ and 305₂ are I2C signals from: Fans, a door switch signal, power line units, power supplies, and a pair of battery backup units, as shown in FIG. 16. This coupling is through multiplexing to be described below.

As is known, each I2C signal requires two ports, or pins; one for clock and one for data. Thus, if one were to couple each of the sixteen disk drives to an ECM board such ECM board would require, in this example, 82 ports, or pins. More particularly, for the ECM board 305₁ shown in FIG. 16, such ECM board would require: 6 pins for the fans, 16 pins for the directors, 8 pins for the memory boards, 32 pins for the disk drives, 2 pin for the door switch, 4 pins for the power line units, 4 pins for the power supplies, 4 pins for the batteries, 4 pins for the CCM boards 304₁, 304₂ and 2 pin for the other ECM board 305₂. Here, however, there are only 58 pins available for the ECM board. Thus, as will be described in more detail in connection with FIG. 17, a portion (referred to below as Level 1 and Level 2 in connection with FIG. 17) of the multiplexing between the microprocessor 480 (FIG. 15) and the elements being monitored (enumerated above) is on the ECM board and another portion of such multiplexing (referred to as Level 3 in connection with FIG. 18) is on the port bypass cards (PBCs). Thus, the multiplexer 500 shown in FIG. 15 implements Level 1 and Level 2 of the multiplexing and multiplexers on the PBCs, to be described in connection with FIG. 17, implement Level 2 of such multiplexing.

Figure 17:
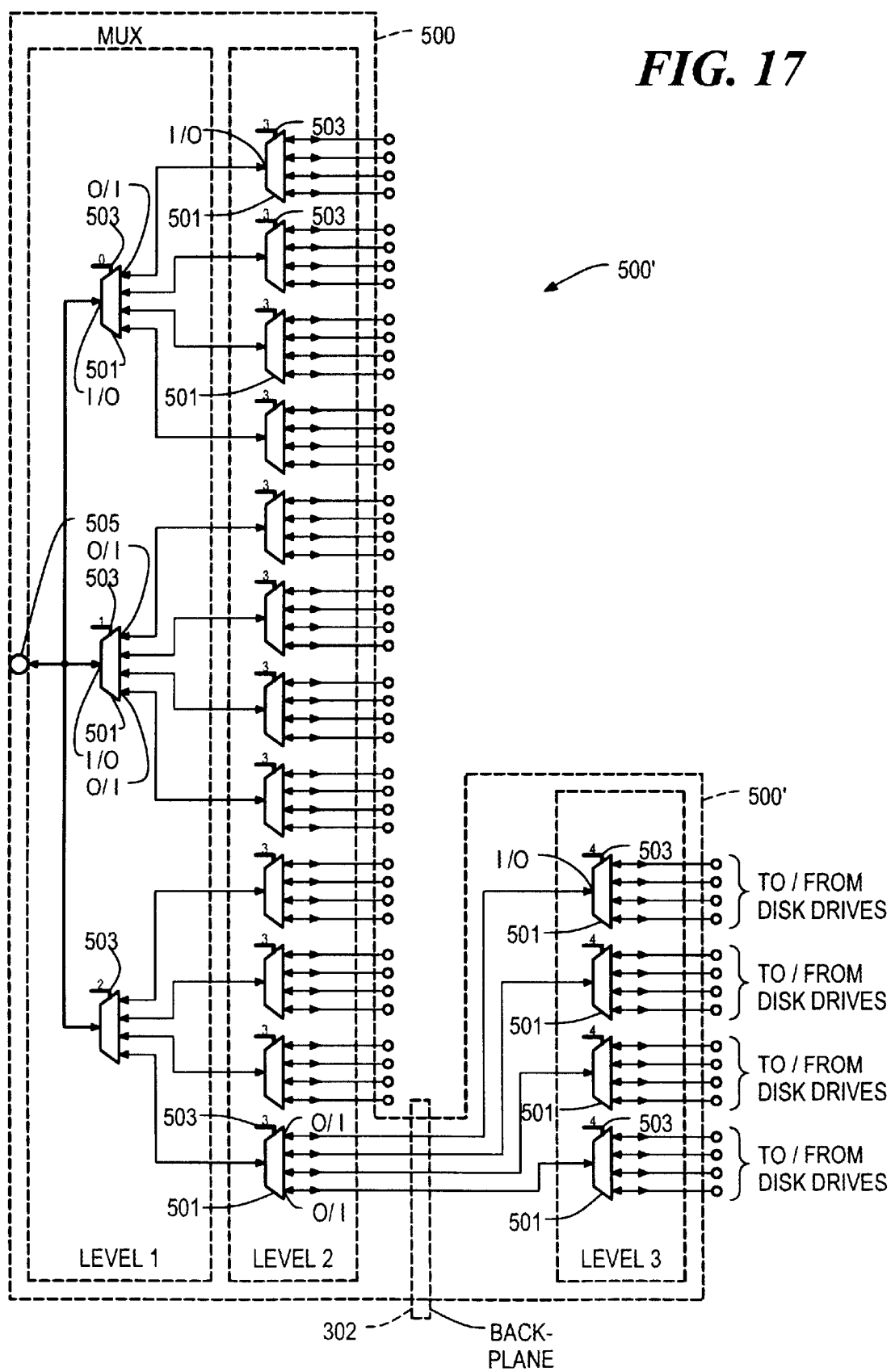
FIG. 17 is a diagram of the multiplexer shown in FIG. 17A and used therewith in accordance with the invention.
Figure 17A:
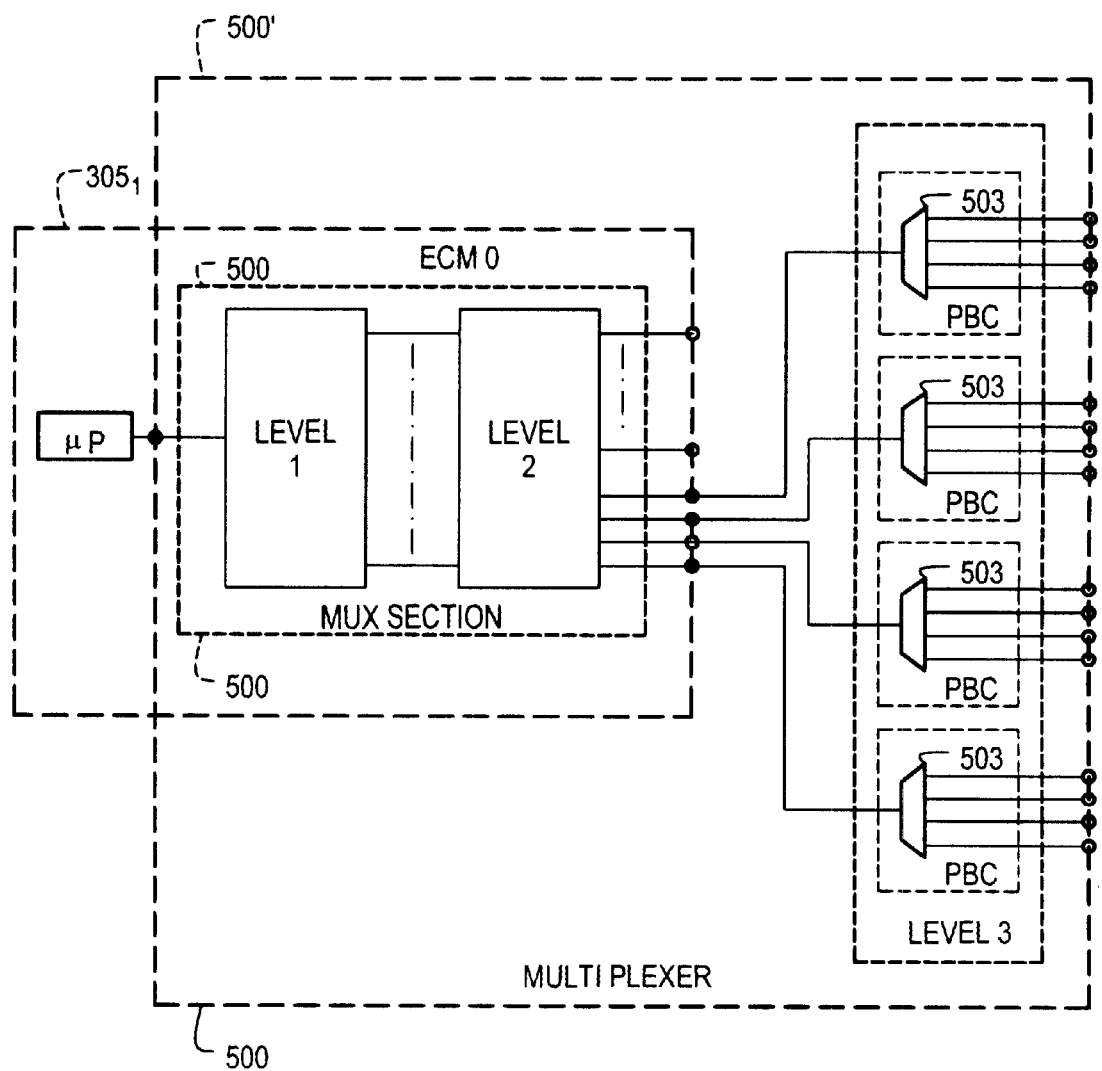
FIG. 17A is a diagram of the ECM of FIG. 15 and a multiplexer used therewith in accordance with the invention.
Figure 18:
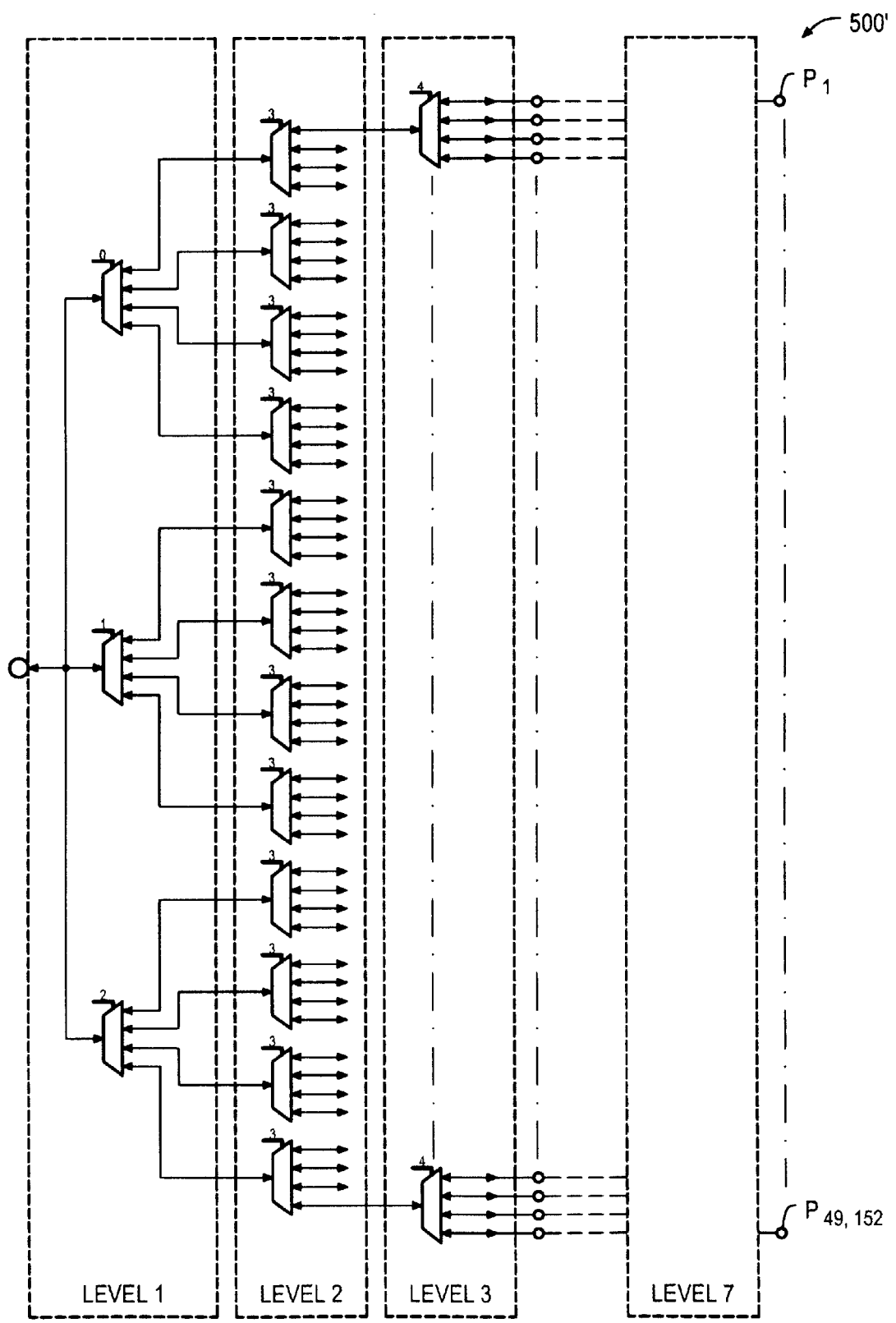
FIG. 18 is a diagram of the multiplexer shown in FIG. 17A and used therewith in accordance with the another embodiment of the invention.

Referring now to FIG. 17, an I2C multiplexer (MUX) 500' is shown. The multiplexer 500' is a function representation of the multiplexing described above and physical is implemented with multiplexer 500 (FIG. 15) and PCA devices to be described on the PBCs, as shown in FIG. 17A. More particularly, as shown in FIG. 17, the multiplexer 500 in its physical implementation includes three levels of PCA9544, four Channel I²C Multiplexer and Interrupt Controllers manufactured by Philips, herein designated as a PCA device 501. Each one of the PCA device 501 is hardwired to a 3-bit signal, or code, on bus 503, as shown, which serves as the address for the device 501, (i.e., an device address code, referred to as hardwired, selectable bits in the Philips spec sheet for the PCA9544). It is noted that the multiplexer 500 has three cascaded levels of devices 501, herein designated as Level 1, Level 2 and Level 3. Each one of the devices 501 couples data between input/output port I/O and one of four output/input O/I ports (or channels) thereof in accordance with a 2-bit channel select code embedded in the data at either the I/O port of the device 501. Thus, the 2-bit channel select code selectively couples the input/output port to one of the four O/I ports of the device. Thus, the data sent to a device 501 is serial data that includes a 3-bit device address code, and a 2-bit channel select code, along with a read/write code. In any event, the 3-bit device address code is inspected by the device to determine whether it is the same as the hardwired 3-bit code on the device address bus 503. If the 3-bit device address code sent to the device is the same as the code hardwired to the device, the associated data will then pass to the O/I port designated by the 2-bit channel select code embedded in such data. If, on the other hand, the 3-bit device address code is not the same as the hardwired 3-bit code on the devices bus 503, the device does not respond to the 2-bit channel select code embedded in such data.

The first level, Level 1, has three devices 501 coupled to port 505. Port 505 is coupled to the microprocessor 480, as shown in FIG. 15. Returning to FIG. 17, the bus 503 of the top device 501 in Level 1 is hardwired to a three-bit signal, here binary 000, the bus 503 of the middle device 501 in Level 1 is hardwired to a three-bit signal, here binary 001, the bus 503 of the bottom device 501 in Level 1 is hardwired to a three-bit signal, here binary 010.

Level 2 has twelve devices 501. The buses 503 of the all the devices 501 in Level 2 are hardwired to a three-bit signal, here binary 011. All devices in Level 3 are hardwired to a three-bit signal, here 100.

The O/I port of the devices 501 in Level 2 is connected to the I/O port of a corresponding one devices 501 in Level 3, as shown in FIG. 17. As noted above, Level 1 and Level 2 devices 501 are implemented in multiplexer 500, as shown in FIG. 17A. The O/I ports of the Level 2 devices 501 are coupled to the elements of the system as described above in connection with FIG. 18, except for the PBCs in such FIG. 16. Because of the limited number of pins available on the ECM board $305_1$, $305_2$, the four O/I pins of the bottom device 501 in Level 2 are coupled to a corresponding one of four PBC adapter boards through the backplane 302 as shown in FIGS. 17 and 17A. Thus, as noted above, the multiplexer 500' is implemented using multiplexer 500 and the device 501 on each of four PBC adapter boards.

In operation, consider data is to be transferred from the microprocessor 480. The microprocessor will include the 3-bit device address code and thereby designate one of the three Level one devices 501 to respond. Assume for example, the 3-bit address code is 010. Thus, only the bottom Level 1 device 501 will respond. The data from the microprocessor 480 will then pass, in response to the 2-bit channel select code embedded with such data, to a designated one of the four O/I ports of the bottom Level 1 device. Here, in this example, to a designated one of the bottom set of four devices in Level 2. The specific one of the bottom devices in the set of four devices in Level 2 is established by the 2-bit channel select code. Let it here be assumed tat the channels select code for selecting the top through bottom channels of the device are 00, 01, 10, and 11 respectively. Thus here, in this example, the 2-bit channel select code produced by the microprocessor 480 for the addressed bottom device in Level 1 is 11 thereby establishing a path between the microprocessor 480 and the bottom device Level 2.

Having established a path between the microprocessor 480 and the bottom device in Level 2, it is first noted that this established path will not change unless reset or changed by the microprocessor. Next, the microprocessor 480 sends a new device address code and a new channel select code to the device connected to the selected Level 2 device. The address code is 011, it being noted that such not used in any Level 1 device. The microprocessor also send the 2-bit channel select code to selected the desired O/I port of the bottom device in level 2 to thereby select one of four devices in Level 3. Here, for example, if the top device in Level 3 is desired, the 2-bit channel select code sent to the bottom device in Level 2 is 00. Thus, a path is now established between the microprocessor 480 and the top device in Level 3 via the bottom device in Level 1 and the bottom device in Level 2.

Having established a path between the microprocessor 480 and the top device in Level 3 via the bottom device in Level 1 and the bottom device in Level 2, the microprocessor 480 send a new address and device code to the device connected to the top device in Level 3. The three bit device code is 100, it being noted that such not used in any Level 1 or Level 2 devices. The microprocessor also send the 2-bit channel select code to selected the desired O/I port of the top device in level 3 to thereby select one of four PBCs connected to such device. Here, for example, if the second from the top PBC is desired, the channel select code sent to the top device in Level 3 is 01. Thus, a path is now established between the microprocessor 480 and the selected PBC (and hence to one of the disk drives as selected by additional data sent to the selected PBC from the microprocessor 480 through the established path).

Thus, it is noted by generalizing the example above, each multiplexer device in the multiplexer has an N bit device code, here in this specific embodiment, N=3. The particular device in the multiplexer responds when it is wired to N bits corresponding to the N bit device code. Further, each device has an input/output port and $2^C$ output/input ports, or channels. In the example above, C=2. It is noted that instead of having $2^N$ devices in a single level, which would have resulted in only $2^N \times 2^C$, or here 32 channels (i.e., output/input ports) for the entire multiplexer, here we have less than $2^N$ devices in the first level. Consequently, not all device codes are used in a single level but rather unused device codes enable further cascading and branching for other cascaded levels of the devices. Thus, here we have $2^N-5$ devices used in a first level, i.e., Level 1 resulting in $[2^N-1] \times 2^C$ channels, here 12 channels. However, by not using all $2^N$ devices in a single level, there are unused three bit device address codes, i.e., here unused codes 011, 100, 101, 110, and 111. The unused code 011 is used for all devices in Level 2; there being no ambiguity in Level 2 since the data will only flow through a unique one of the Level 1 devices. Thus, there are here $[2^N-5] \times 2^C=12$ devices in level 2. In like manner, unused code 100 is used for all the Level 3 devices. Therefore, there are $[2^N-5] \times 2^C \times 2^C = [2^N-5] \times 2^{2C} =$ 48 devices in level 3. This therefore results in $[2^N-5] \times 2^{3C}$ channels or 192 channels for level 3, and so forth for additional cascaded levels. Thus, but not using the $2^N$ devices in a single level, a far greater number of channels than $2^N \times 2^C$ can be achieved.

It should be noted that while three levels have been described the concept may be extended to enable establishment of up to 7 levels and therefore up to 12,288 paths or channels.

SERVICE PROCESSOR NETWORKS

Figure 12:
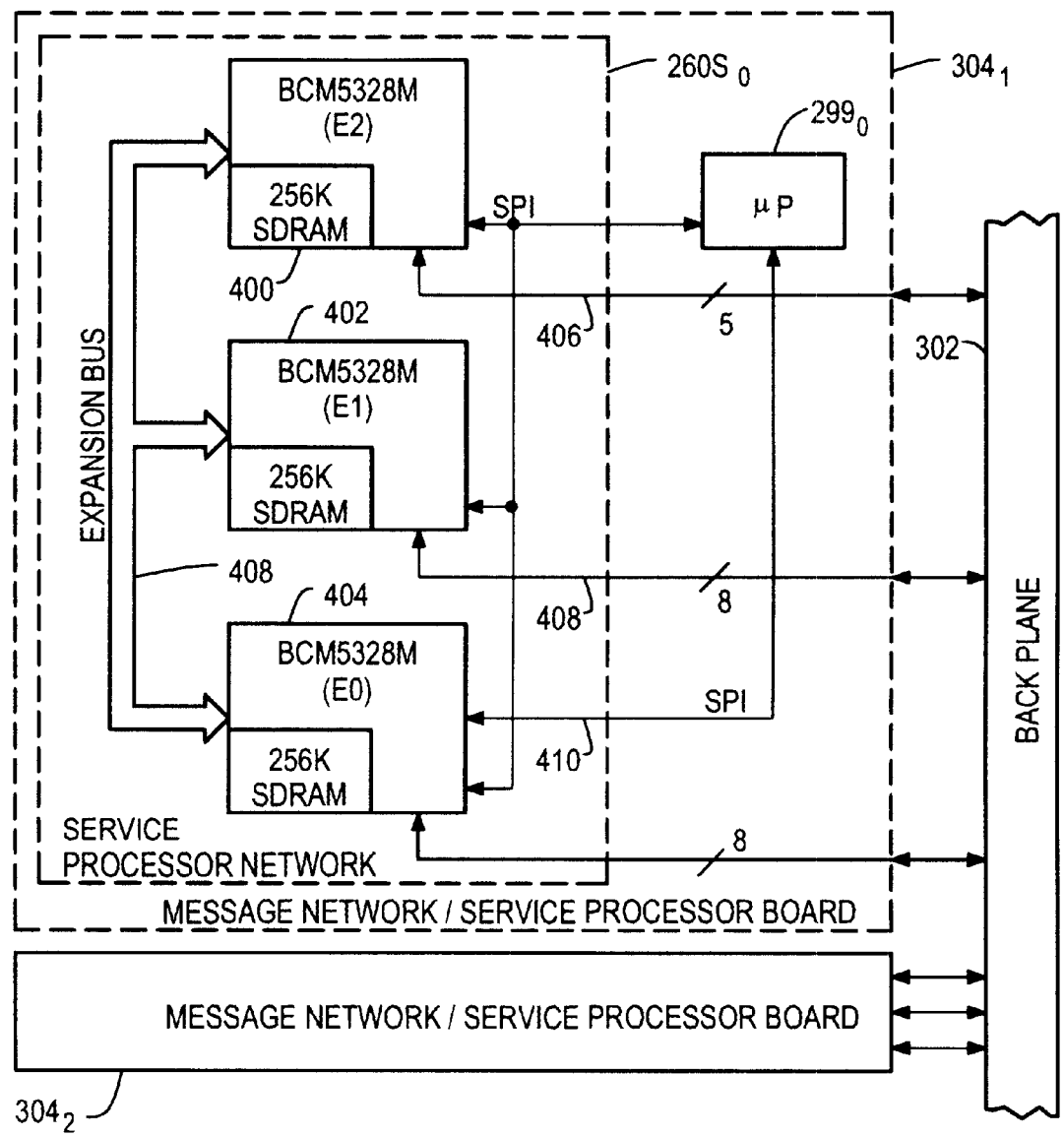
FIG. 12 is a block diagram of message network/service processor boards used in the system of FIGS. 2 and 3 according to the invention.
Figure 13:
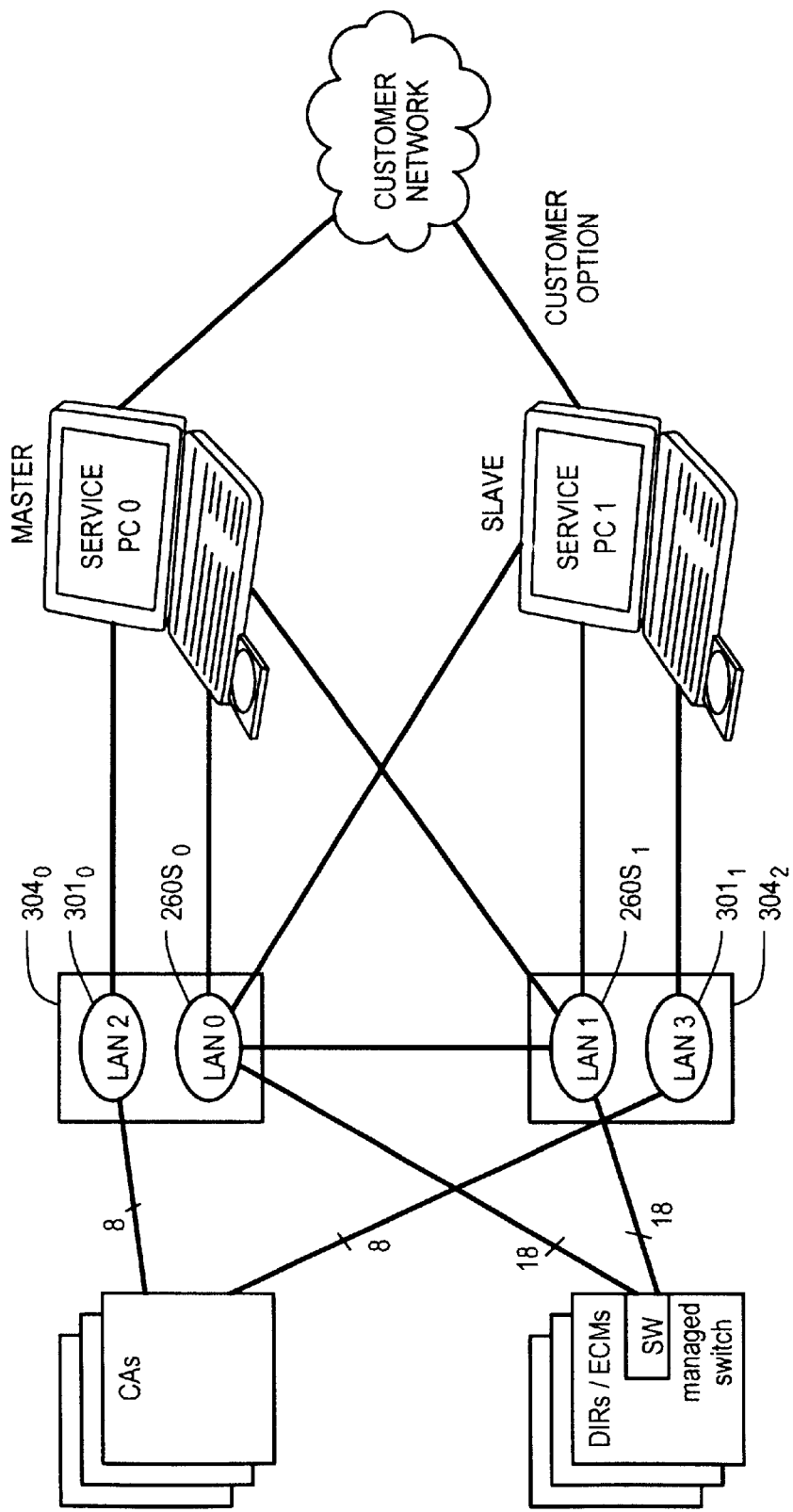
FIG. 13 shows the Ethernet topology used to connect the computer adapter networks, ECMs, and service processor of the system of FIGS. 2 and 3 according to the invention.

Referring now to FIG. 12, a pair of the redundant message network/service processor boards $304_1$, $304_2$ (FIG. 7) is shown plugged into the backplane 302. As noted above, both boards $304_1$, $304_2$ are identical in construction, the service processor network $260P_0$ of board $304_1$ being shown in detail along with the microprocessor $299_0$ on such board $304_1$. The message network $260P_0$ is shown to include three switching fabric modules 400, 402 and 404, here Broadcom® ROBOSmartSwitch™ family of Ethernet switches, BCM5328M modules manufactured by Broadcom, Irvine, Calif., interconnected by a bus 408, as shown. Modules 400, 402 and 404 are coupled to the microprocessor $299_0$ as shown here though three SP1 buses, as shown. Module 400 is coupled to PC0, PC1, ECM $305_1$, ECM $305_2$ through Ethernet buses collectively shown as bus 406. Module 402 is coupled to eight of the director boards as described in FIG. 7 through eight Ethernet buses collectively referred to as bus 408. Module 404 is coupled to the remaining eight director boards as described in FIG. 7 through eight Ethernet buses collectively referred to as bus 410. The Ethernet topology for the CAs, directors, ECMs, LANs and PCs is shown in FIG. 13.

A number of embodiments of the invention have been described. Nevertheless, it will be understood that various modifications may be made without departing from the spirit and scope of the invention. Accordingly, other embodiments are within the scope of the following claims.

What is claimed is:

1. A multiplexer having a plurality of multiplexer devices, each one of the devices being adapted to couple a selected one of a plurality of $2^C$ output/input ports, where C is an integer, to an input/output port of such device when an N bit device address code fed to such device matches an N bit device address wired to the device, such one of the output/input ports being selected in accordance with a C bit channel select code fed to the device, such multiplexer comprising:

a plurality of cascaded levels of such devices, a first one of such levels having a plurality of [$2^N$–M], where M is a non-zero integer less than $2^N$ of the devices;

wherein a common port for the multiplexer is connected to the input/output ports of the plurality of the devices in the first level; and wherein input/output ports of the devices in a succeeding level are connected to the output/input ports of the devices in the preceding level of devices.

2. The multiplexer recited in claim 1 wherein N is 3 and M is 5.

3. The multiplexer recited in claim 2 wherein each one of the devices passes an I2C signal.

* * * * *